United States Patent
Hirokane et al.

(10) Patent No.: US 6,762,989 B2
(45) Date of Patent: *Jul. 13, 2004

(54) OPTICAL DISK HAVING GROOVE ADDRESS PITS AND LAND ADDRESS PITS OF EQUAL DEPTHS

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/280,316

(22) Filed: Oct. 25, 2002

(65) Prior Publication Data

US 2003/0053407 A1 Mar. 20, 2003

Related U.S. Application Data

(62) Division of application No. 09/675,240, filed on Sep. 29, 2000, now Pat. No. 6,510,129.

(30) Foreign Application Priority Data

Sep. 29, 1999 (JP) ............................. 11-277225

(51) Int. Cl.⁷ ................................................ G11B 7/24
(52) U.S. Cl. ................................... 369/275.4; 428/64.4
(58) Field of Search ..................... 369/275.4, 275.3, 369/275.2, 13.54, 13.55; 428/64.4, 64.1, 64.3; 430/320, 321

(56) References Cited

U.S. PATENT DOCUMENTS

| | | | | |
|---|---|---|---|---|
| 5,144,552 A | * | 9/1992 | Abe | 369/275.4 |
| 5,353,277 A | * | 10/1994 | Yasuda et al. | 369/275.4 |
| 5,383,176 A | * | 1/1995 | Inui et al. | 369/275.4 |
| 5,487,164 A | * | 1/1996 | Kirchhofer et al. | 369/275.4 |
| 5,500,850 A | * | 3/1996 | Van et al. | 369/275.4 |
| 5,583,847 A | * | 12/1996 | Takeshima et al. | 369/275.4 |
| 5,602,824 A | * | 2/1997 | Ooki et al. | 369/275.4 |
| 5,892,752 A | * | 4/1999 | Matsuura | 369/275.4 |
| 5,946,288 A | * | 8/1999 | Ogawa | 369/275.4 |
| 6,226,257 B1 | * | 5/2001 | Morimoto | 369/275.4 |

FOREIGN PATENT DOCUMENTS

| | | |
|---|---|---|
| EP | 570 235 A2 | 11/1993 |
| JP | 7-161077 | 6/1995 |
| JP | 11-003547 | 1/1999 |
| JP | 2001-067733 | 3/2001 |

* cited by examiner

Primary Examiner—Tan Dinh
(74) Attorney, Agent, or Firm—David G. Conlin; William J. Daley, Jr.; Edwards & Angell, LLP

(57) ABSTRACT

An optical recording medium includes a substrate having groove and land areas, in which address pits having substantially the same depth and which are formed deeper than the groove area are provided. By thus forming the address pits deeper than the groove area, address information can be reproduced accurately, and the optical recording medium can readily be manufactured by making the address pits which are respectively formed in the groove and land areas to have substantially the same depth.

7 Claims, 14 Drawing Sheets

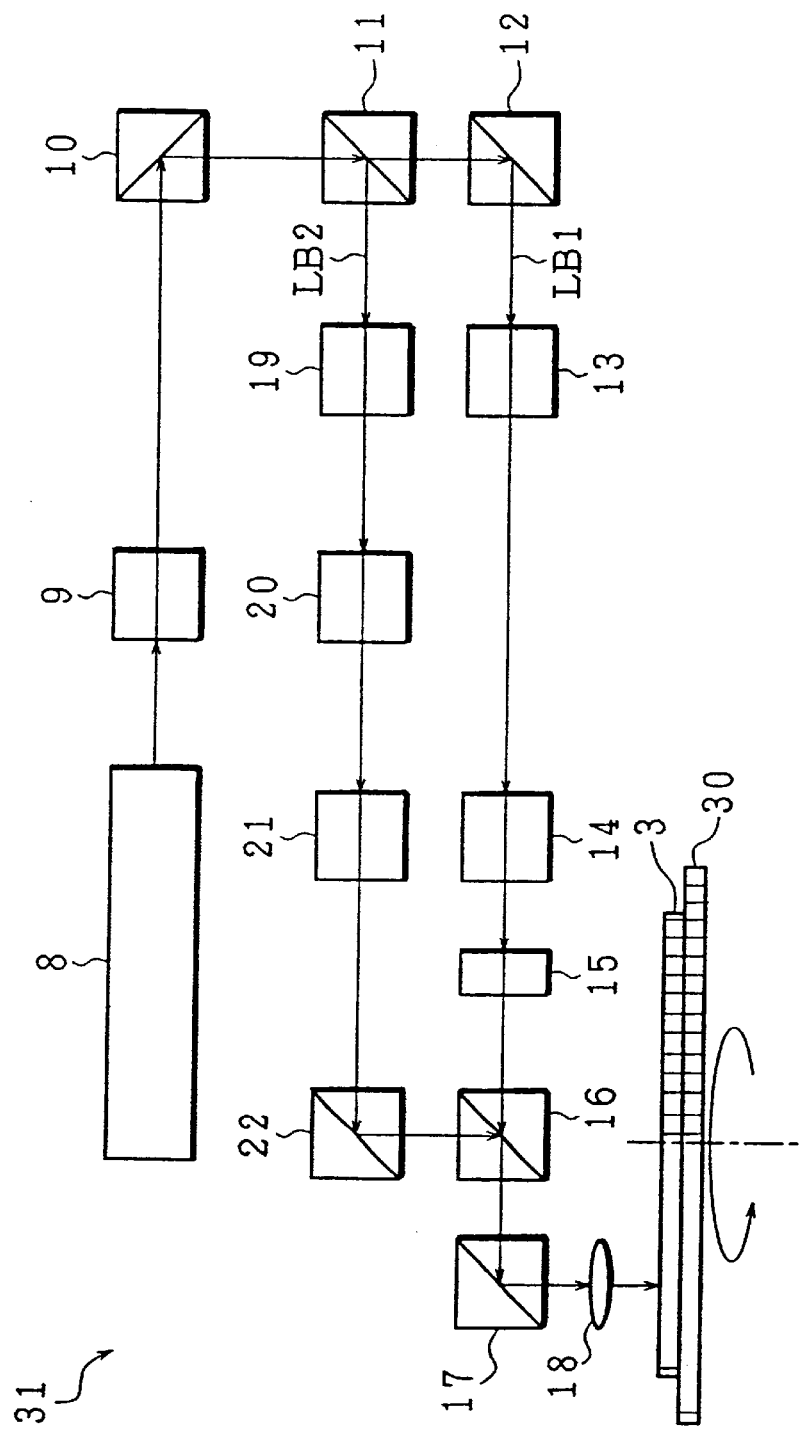

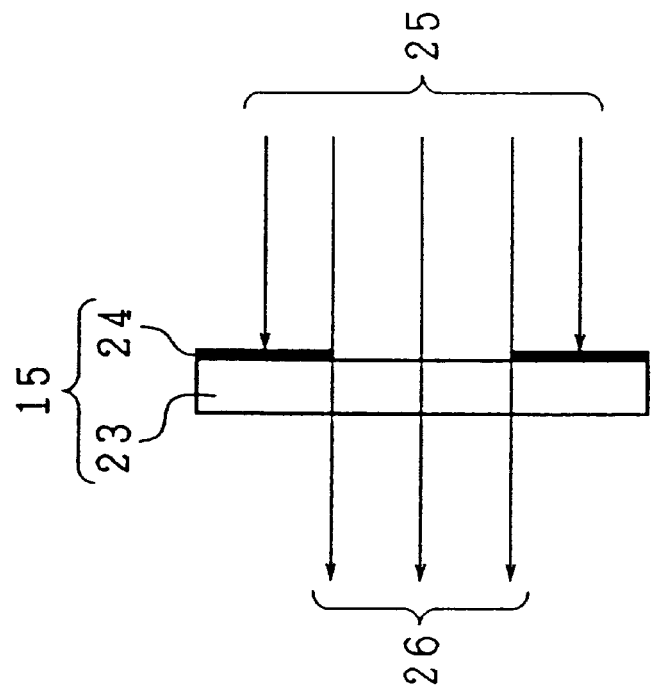
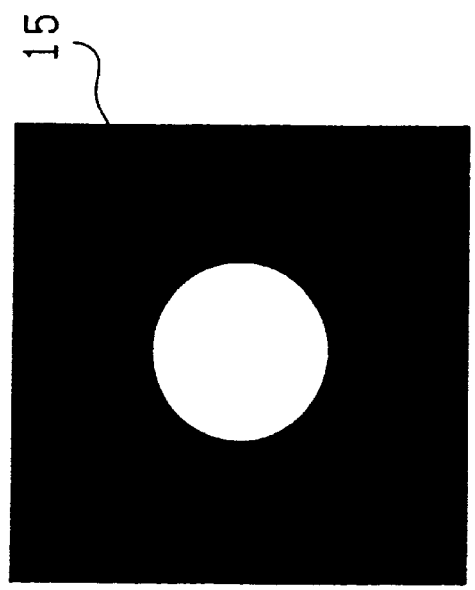

OPTICAL DISK HAVING GROOVE ADDRESS PITS AND LAND ADDRESS PITS OF EQUAL DEPTHS

CROSS REFERENCE TO RELATED APPLICATIONS

This application is a divisional application of U.S. patent application Ser. No. 09/675,240, filed Sep. 29, 2000 now U.S. Pat. No. 6,510,129.

FIELD OF THE INVENTION

The present invention relates to an optical recording medium adopting a land and groove recording system and a manufacturing method of a master disk of the optical recording medium which is used to produce a substrate of the medium, and to a cutting device used in the manufacturing method.

BACKGROUND OF THE INVENTION

Conventionally, a magneto-optical disk of a magneto-optical recording system has been used in practical applications as a re-writable optical recording medium. The magneto-optical disk in general has a groove area (area of a guide groove) and a land area (area between the guide grooves) which are formed into a spiral or a concentric circle on a disk substrate, and either of which includes a recording track. Additionally, a light beam emitted from a semiconductor laser is converged and projected onto the recording track, thereby causing a local rise in temperature of the recording track and recording or erasing information. Further, a light beam whose intensity is such that the information is not erased is converged and projected on the recording track, and by recognizing the polarization state of reflected light, the information is reproduced.

Further, among methods of obtaining address information in the magneto-optical disk, a method employing a pit series is commonly adopted. In this method, the pit series is formed continuously on the recording track of the magneto-optical disk, and address information is obtained by reproducing change in quantity of the reflected light from the pit series.

Meanwhile, lively studies and developments with respect to magnetic super resolution reproduction using a multilayer magnetic film have largely been improving a reproducing resolution of the magneto-optical disk of a super resolution magneto-optical recording system, and active research on a system of recording information on both of the groove and land areas (land and groove recording system) has been carried out.

Incidentally, in the land and groove recording system, since the recording track is formed for each of the land and groove areas, address pits which correspond to the respective areas are required. FIG. 14 is an explanatory drawing showing a structure of a magneto-optical disk substrate disclosed in Japanese Unexamined Patent Publication No. 161077/1995 (Tokukaihei 7-161077 published on Jun. 23, 1995). As shown in FIG. 14, in this magneto-optical disk substrate, address pits P1 and P2 are formed for a spirally formed groove area G and land area L, respectively, which have the same depth from surfaces of the respective areas G and L, thereby obtaining the respective address information of the groove area G and land area L.

Further, FIG. 15 is an explanatory drawing showing a structure of a magneto-optical disk substrate disclosed in Japanese Unexamined Patent Publication No. 28729/1994 (Tokukaihei 6-28729 published on Feb. 4, 1994). In this magneto-optical disk substrate, a series of address pits P1 having the same depth as that of the groove area G is formed on the groove area G having a spiral shape. On the other hand, on a portion of the land area L away from the portion where the series of address pits P1 are provided, a series of address pits P2 having the same depth as that of the groove area G are formed.

By thus forming the series of address pits P1 and P2 at separate positions, crosstalk caused by an adjacent address pit can be reduced, thereby obtaining accurate address information.

However, a technique disclosed in the above Publication (Tokukaihei 7-161077) requires two or three types of photoresist having different photosensitivities, and an intermediate layer in a complicated exposing and developing process in order to create the groove and address pits in the magneto-optical disk substrate.

Further, the magneto-optical disk substrate disclosed in the publication (Tokukaihei 6-28729) raises such a problem that, since the address pit and groove have the same depth, a reproduced signal from the address pit becomes small, and address information cannot be reproduced accurately.

SUMMARY OF THE INVENTION

It is an object of the present invention to provide an optical recording medium which is easily manufactured and can accurately reproduce address information, and a manufacturing method of an optical recording medium master disk which is used to produce a substrate (optical recording medium substrate) to be used for the foregoing medium, and a cutting device used in the manufacturing method.

In order to attain the foregoing object, an optical recording medium of the present invention present recording medium) includes a groove having a first address pit and a land having a second address pit, in which a groove depth $d_G$, a first address pit depth $d_{P1}$ and a second address pit depth $d_{P2}$ are set to satisfy $$d_G < d_{P1} \approx d_{P2} \tag{a}$$

The present recording medium is an optical recording medium, including an optical disk and a magneto-optical disk such as CD (Compact Disc), for recording and reproducing information by the exposure of a light beam. Moreover, as explained, the present recording medium includes the address pits in both of the groove and land, thereby being an optical recording medium of a land and groove recording system in which both groove and land have the recording tracks.

Particularly, in the present recording medium, as indicated by equation (a) above, the first address pit provided in the groove and the second address pit provided in the land are made deeper than the groove depth. This enables a reproduced signal from these address pits to be intense, thereby reproducing address information accurately and stably.

Further, in the present recording medium, as indicated by equation (a) above, the depth (from the surface of the land) of the first and second address pits are set at values substantially equal to each other. Consequently, these two kinds of address pit can be manufactured by a single manufacturing process, and thus the present recording medium can be manufactured by a relatively facile process.

In order to attain the foregoing object, a manufacturing method (present manufacturing method) of an optical recording medium master disk in which address pits are provided in both of the land and groove, includes the steps of: (a) applying a resist over a master disk substrate; (b)

performing exposure and development with respect to the substrate so as to partially maintain the resist in a groove forming area, while avoiding remaining the resist in a pit forming area; (c) etching a surface of the substrate which is uncovered in the pit forming area; (d) uncovering the surface of the substrate in the groove forming area; and (e) etching the surface of the substrate in both of the groove and pit forming areas.

The present manufacturing method is for manufacture of an optical recording medium master disk (hereafter simply referred to as master disk) which is used to manufacture a substrate used in the optical recording medium. Namely, the foregoing substrate of the optical recording medium is manufactured by injection molding of a substrate material such as resin, in which a stamper obtained from the master disk is used as a mold.

Consequently, the master disk has the same arrangement as that of the substrate of the optical recording medium (including a groove, land and address pit, etc.).

Further, as explained, the present manufacturing method is set to manufacture the master disk having the address pits in both of the groove and land. Therefore, the substrate of the optical recording medium which is manufactured from this master disk is to be adopted in an optical recording medium of a land and groove recording system.

Further, the foregoing groove forming area refers to a portion of a master disk substrate (substrate to be the master disk) where the groove is formed, and likewise, the pit forming area refers to a portion of the master disk substrate where the address pit is formed.

Meanwhile, in the present manufacturing method, the step (b) is set such that the resist partially remains in the groove forming area, while preventing the resist from remaining in the pit forming area.

Further, in the first dry etching process performed after this step, the surface of the substrate which appeared in the pit forming area is etched. On the other hand, since the resist is remaining in the groove forming area, etching by the first dry etching process is avoided therein.

Therefore, at the end of the first dry etching process, the pit forming area of the master disk substrate is deeper by the depth of etching than the groove forming area.

Then, in the present manufacturing method, after the residual resist in the groove forming area is removed by the first ashing process, the groove and address pit are formed by the second dry etching process by etching the master disk substrate appeared in the groove forming and pit forming areas.

As explained, in the present manufacturing method, only the pit forming area is etched in the first dry etching process, while both of the groove forming and pit forming areas are etched in the second dry etching process. Namely, in the present manufacturing method, the groove forming area is etched only once, while the pit forming area is etched twice, thereby forming the address pit deeper than the groove.

Further, in the present manufacturing method, the groove and address pits are formed by etching the master disk substrate appeared in the groove forming and pit forming areas. Accordingly, the groove and address pits are formed into a flat rectangular shape, and it is possible to manufacture the optical recording medium master disk which can suppress groove noise of the optical recording medium, compared with a case where the groove and address pits were formed on the resist surface having fine irregularities.

Further, in the present manufacturing method, the resist applied onto the master disk substrate is a single layer without an intermediate layer which is to be removed afterward, thereby efficiently manufacturing the master disk at low cost.

Additionally, since the depth of the groove and address pits of the master disk can be determined only by the etching conditions of the first and second dry etching processes, the master disk having a desired shape can be manufactured with good reproducibility.

Note that, it is preferable that the present manufacturing method includes a second ashing process to remove the residual resist on the master disk substrate after the second dry etching process. The 'ashing' here refers to a process such as dry etching employing oxygen gas plasma for example, which prevents the surface of the master disk substrate from being further etched, while removing by ashing the resist on the master disk substrate.

Further, in the present manufacturing method, it is preferable to utilize the following cutting device: the cutting device having an arrangement which includes a beam splitter for splitting the light beam which is emitted from the light source into first and second light beams; an objective lens for converging the first and second light beams; and a numerical aperture reducing section for reducing the numerical aperture of the objective lens with respect to the first light beam.

With this cutting device, the first and second light beams can be generated from a single light source, and the numerical aperture of the objective lens with respect to the first light beam can be reduced by the numerical aperture reducing section.

The spot diameter of the light beam becomes $\lambda/NA$ when $\lambda$ is the wavelength of the light beam, and NA is the numerical aperture with respect to the light beam. Therefore, by reducing the numerical aperture, the spot diameter of the light beam can be increased. Accordingly, by using the foregoing cutting device, the first and second light beams having different spot diameters can readily be generated.

Note that, as the numerical aperture reducing section, for example, a light shielding plate which reduces the diameter of the first light beam can be adopted.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 11 is an explanatory drawing showing a structure of a cutting device which can carry out the exposing process of FIG. 5.

FIG. 12(a) is a plan view showing a structure of a light shielding plate provided in the cutting device of FIG. 11.

FIG. 12(b) is a cross sectional view showing the structure of the light shielding plate provided in the cutting device of FIG. 11.

DESCRIPTION OF THE EMBODIMENTS

[First Embodiment]

The following will explain one embodiment of the present invention with reference to drawings.

Figure 2:
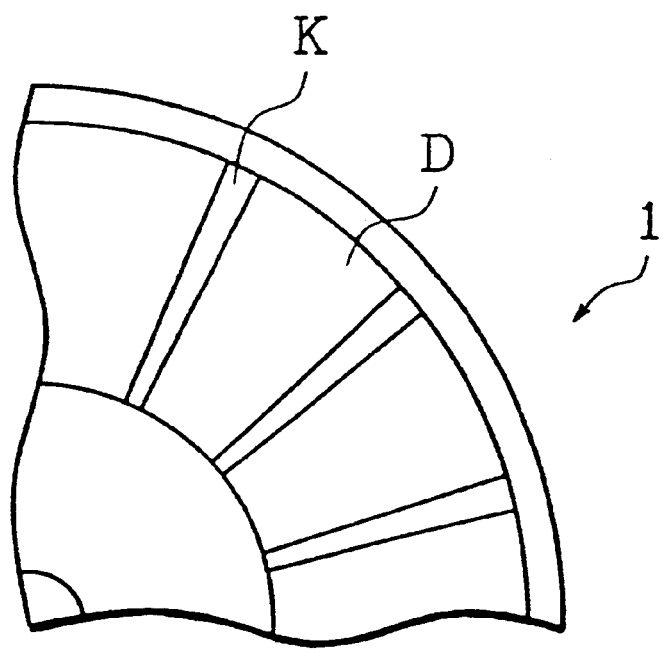
FIG. 2 is an explanatory drawing showing a structure of the foregoing optical disk substrate.

FIG. 2 is an explanatory drawing showing a structure of a magneto-optical disk substrate 1 according to the present embodiment ("present disk substrate", hereinafter). The present disk substrate 1 is made of polycarbonate. In addition, as shown in FIG. 2, the present disk substrate 1 is made up of a data area D for recording information, and a pre-format area K for recording address information, which are formed alternately in a peripheral direction. Further, a groove and land areas having a shape of either a spiral or a concentric circle are formed in the areas D and K.

Figure 1:
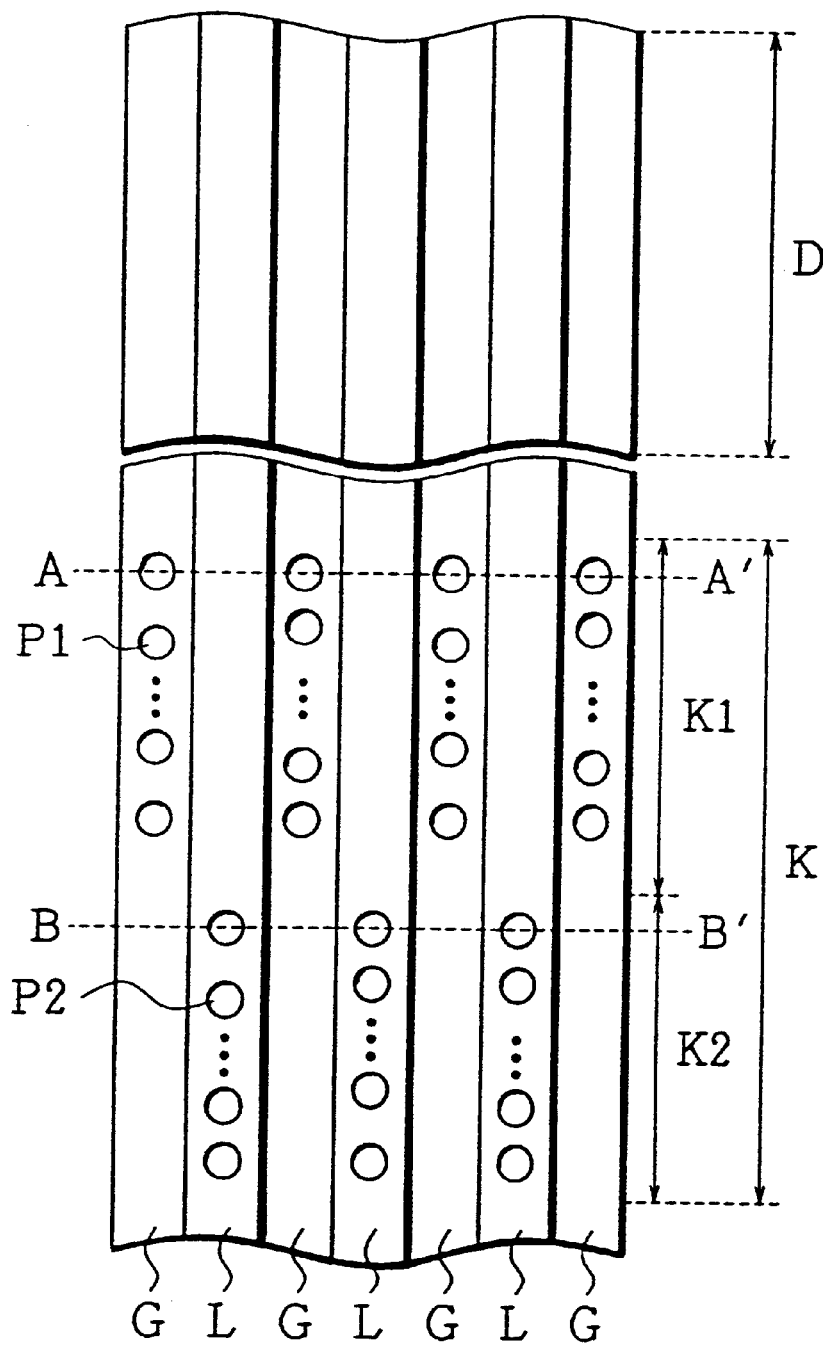
FIG. 1 is an explanatory drawing showing a structure of a pre-format and data areas of a magneto-optical disk substrate according to a First Embodiment of the present invention.

FIG. 1 is a plan view showing an arrangement of the data area D and pre-format area K. Further, FIGS. 3 and 4 are cross sectional views of FIG. 1 taken along the lines A–A' and B–B', respectively.

As shown in FIG. 1, the groove area G and land area L of the present disk substrate 1 are provided continuously in a radial direction of the present disk substrate 1. In addition, a width of the groove area G and that of the land area L are substantially equal to each other, and the width is set at a predetermined track pitch.

Figure 3:
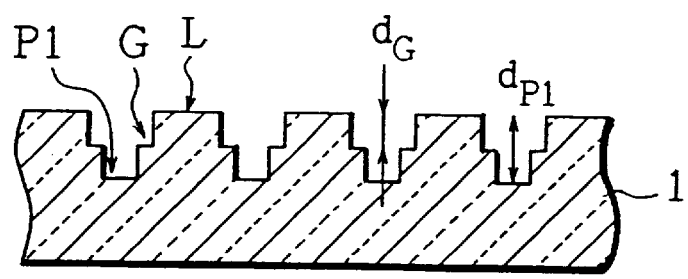
FIG. 3 is a cross sectional view of the disk substrate of FIG. 1 taken along the line A–A'.
Figure 4:
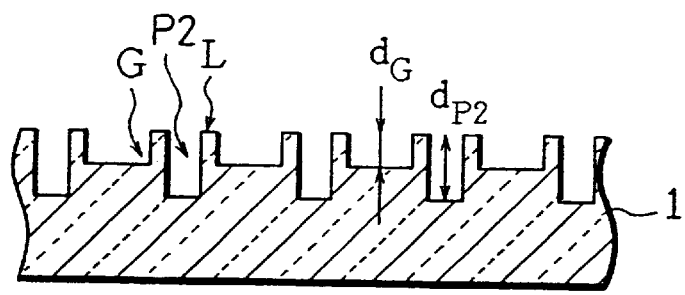
FIG. 4 is a cross sectional view of the disk substrate of FIG. 1 taken along the line B–B'.

Further, a track depth (groove depth) $d_G$ of the groove area G as shown in FIGS. 3 and 4 is set so that tracking by a push-pull method can be performed desirably. Namely, when n is a refractive index of the present disk substrate 1, and $\lambda$ is a wavelength of laser light for carrying out recording and reproduction with respect to a magneto-optical disk having the present disk substrate 1, the groove depth $d_G$ is set at a depth in the vicinity of $\lambda/(8n)$.

Further, in the present disk substrate 1, the groove area G and land area L of the pre-format area K include address pits P1 and P2, respectively.

These address pits P1 and P2 are, as shown in FIG. 1, formed in a groove pit area K1 and land pit area K2 which are two different areas separated in a peripheral direction. Namely, these address pits P1 and P2 are provided in a radial direction of the present disk substrate 1 so as to avoid adjoining each other.

Further, as shown in FIGS. 3 and 4, depths (pit depths) of the address pits P1 and P2 from the surface of the substrate (surface of the land area L) are substantially the same. Namely, in the present disk substrate 1, an address pit P1 depth $d_{P1}$ and an address pit P2 depth $d_{P2}$ are set at values which are substantially equal to each other ($d_{P1} \approx d_{P2}$). Accordingly, the address pit P1 depth $d_{P1}$ and address pit P2 depth $d_{P2}$ are hereinafter referred to as a pit depth $d_P$.

Further, the pit depth $d_P$ is set at a depth which can increase change in quantity of reflected (catoptric) light so that address information can be reproduced/read out preferably. Namely, the pit depth $d_P$ is set at a depth in the vicinity of $\lambda/(4n)$.

As explained, in the present disk substrate 1, a groove area G depth $d_G$ is in the vicinity of $\lambda/(8n)$, while the pit depth $d_P$ of the address pits P1 and P2 is in the vicinity of $\lambda/(4n)$ which is deeper than the groove area G depth $d_G$. Thus, reproduced signals from the address pits P1 and P2 can be strengthened, thereby reproducing address information accurately and stably.

Furthermore, since the address pits P1 and P2 are formed in the areas K1 and K2 which are different from each other and separated in the peripheral direction, generation of crosstalk from adjacent address pits can be suppressed greatly.

Further, in the present disk substrate 1, the widths of the groove area G and land area L are substantially equal to each other, and each of which is a predetermined track pitch. Accordingly, a recording track can be formed in both areas G and L with ease, thereby attaining desirable land and groove recording.

Note that, the groove depth $d_G$ and pit depth $d_P$ are not necessarily set in the vicinity of $\lambda/(8n)$ and $\lambda/(4n)$, respectively. A desired range of the groove depth $d_G$ and pit depth $d_P$ will be explained in detail below.

Further, though the present disk substrate 1 is made of polycarbonate in the present embodiment, a material of the present disk substrate 1 is not limited to this, but can be made of any material which has light transmissivity. In addition, a desired material of the present disk substrate 1 includes resin or glass having light transmissivity.

Meanwhile, the present disk substrate 1 is manufactured by injection molding of resin, in which a stamper obtained by electroforming a master disk is adopted as a mold. In addition, since it is determined in the present disk substrate 1 that the pit depths of the address pits P1 and P2 have the values substantially equal to each other (pit depth $d_P$), a manufacturing process with respect to the address pits P1 and P2 can be made the same.

Consequently, by exposing and etching processes shown in a Second Embodiment below, the master disk of the present disk substrate 1 can readily be manufactured with desirable reproducibility.

[Second Embodiment]

The following will explain another embodiment of the present invention. For ease of explanation, members having the same functions as those shown in the drawings pertaining to the First Embodiment above will be given the same reference numerals/symbols, and explanation thereof will be omitted here.

A manufacturing method ("present manufacturing method", hereinafter) of a master disk ("present master disk", hereinafter) of the present disk substrate 1 shown in the First Embodiment will be explained in the present embodiment.

Note that, the present master disk has the same structure as that of the present disk substrate 1 shown in FIGS. 1 through 4. Therefore, for simplification of explanation, FIGS. 1 though 4 are hereinafter adopted as drawings indicative of a structure of the present master disk, and elements in the present master disk corresponding to the data area D, pre-format area K, groove area G, land area L and address pits P1 and P2 are called a data area D, pre-format area K, groove area G, land area L and address pits P1 and P2, as in the present disk substrate 1.

In the present manufacturing method, the present master disk is obtained by the processes of exposure, development and etching on a master disk glass substrate which has been coated with photoresist. First, the following will explain the exposing process of the present manufacturing method.

Figures 5A, 5B, 5C:
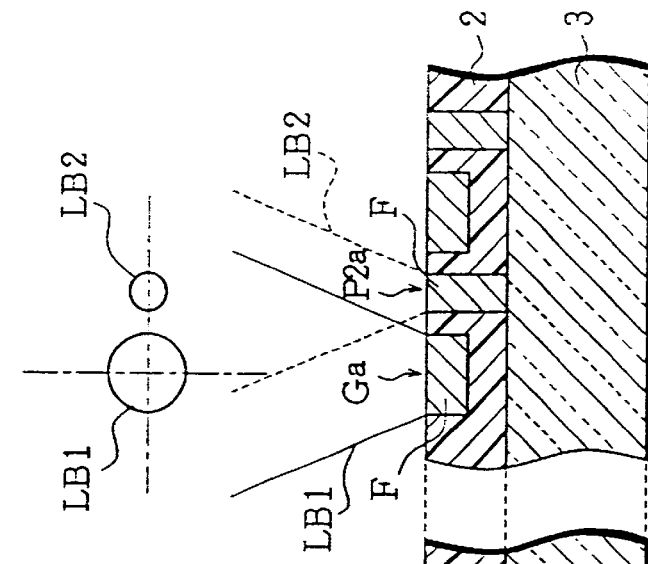
FIGS. 5(a) through 5(c) are explanatory drawings showing an exposing process in a manufacturing method of a master disk of the disk substrate of FIG. 1.

FIGS. 5(a) through 5(c) are explanatory drawings showing the exposing process of the present manufacturing method. As shown in FIGS. 5(a) through 5(c), the present exposing process is the process in which photoresist 2 applied to the glass substrate (master disk glass substrate) 3 is exposed by light beams (light beams for exposure) LB1 and LB2, which can be performed by using a cutting device (exposure device) having a light source of the light beam and a turning table.

More specifically, in the present exposing process, first, the photoresist 2 is applied to the surface of the glass substrate 3 by a spin-coating method, etc. Then, a predetermined portion of the photoresist 2 is exposed by converging the light beams LB1 and LB2 thereon, while rotating the glass substrate 3 on the turning table of the exposure device.

Note that, in the present exposing process, projection positions of the light beams LB1 and LB2 are moved continuously in a radial direction, thereby spirally forming an exposed portion F over the photoresist 2 on the glass substrate 3.

Further, as shown in FIGS. 5(b) and 5(c), since each of the light beams LB1 and LB2 has a spot diameter which is different from the other, these light beams LB1 and LB2 expose portions which become the groove area G and the address pits P1 and P2 (see FIGS. 2 and 3), respectively.

Namely, as shown in FIG. 5(a), in the data area D (see FIG. 1) where the address pits P1 and P2 are not provided, only the light beam LB1 having a larger spot diameter is set to converge on a portion where the groove area G should be formed (groove forming area Ga).

Light intensity of the light beam LB1 is adjusted to such intensity as not to completely expose the photoresist 2 at the groove forming area Ga. Namely, the exposed portion F is formed not to penetrate the photoresist 2 to the base (to the surface of the glass substrate 3) in the groove forming area Ga.

Further, as shown in FIG. 5(b), with respect to a groove pit area K1 (see FIG. 1), the light beam LB1 exposes the groove forming area Ga, while the light beam LB2 having a spot diameter which is smaller than that of the light bean LB1 is converged on a portion (first pit forming area P1a) where the address pit P1 should be formed in the groove forming area Ga.

Light intensity of the light beam LB2 is adjusted to such intensity as to completely expose the photoresist 2 of the exposed portion. Accordingly, projection of the light beam LB2 results in forming the exposed portion F to the base of the photoresist 2 only in the first pit forming area P1a within the groove forming area Ga.

Further, as shown in FIG. 5(c), with respect to a land pit area K2 (see FIG. 1), the light beam LB1 exposes the grove forming area Ga, while the light beam LB2 is moved to the center of a portion to be the land area L, and this light beam LB2 is converged on a portion (second pit forming area P2a) where the address pit P2 should be formed, thereby completely exposing the photoresist 2 at the second pit forming area P2a as with the first pit forming area P1a, and forming the exposed portion F to the base of the photoresist 2.

Note that, the movement of the projection position of the light beam LB2 can be attained by inserting a polariscope in an optical path of the light beam LB2 in the cutting device so as to change an angle of incidence with respect to a collective lens (objective lens).

Next, the following will explain the developing process. In this process, the glass substrate 3 which has the exposed photoresist 2 as shown in FIGS. 5(a) through 5(c) is exposed to remove the exposed portion F of the photoresist 2.

Figure 6A:
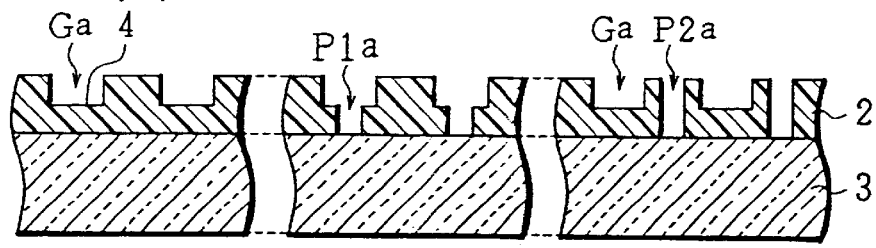
FIGS. 6(a) through 6(e) are explanatory drawings showing an etching process in the foregoing manufacturing method.

FIG. 6(a) is an explanatory drawing showing the glass substrate 3 after the developing process, and more specifically, the drawing indicates developed states in the data area D, groove pit area K1 and land pit area K2 (see FIG. 1) which are shown on the left, center and right, respectively. As shown in FIG. 6(a), in the pit forming areas P1a and P2a which were completely exposed by the light beam LB2, the photoresist 2 is completely removed in the developing process, and a smooth surface of the glass substrate 3 is uncovered.

In contrast, in the groove forming area Ga which was incompletely exposed by the light beam LB1, a portion of the photoresist 2 which was left unexposed (a portion in the vicinity of the base) remains undeveloped as a first residual resist film 4, which prevents the surface of the glass substrate 3 from being uncovered.

Next, the following will explain the etching process of the present manufacturing method with reference to FIGS. 6(a) through 6(e). Note that, in FIGS. 6(b) through (e), the data area D, groove pit area K1 and land pit area K2 of the glass substrate 3 are shown on the left, center and right, respectively, as in FIG. 6(a).

Figure 6B:
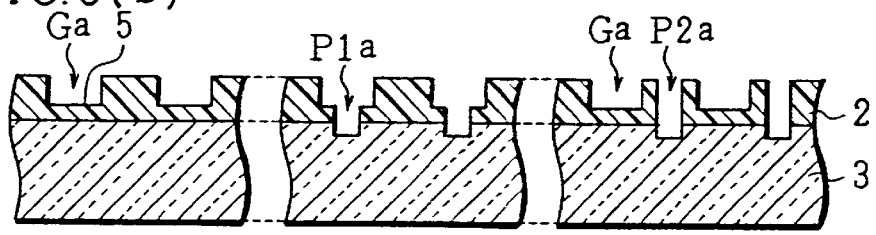

In the etching process of the present manufacturing method, first, first dry etching (reactive etching) is applied to the glass substrate 3 in he state shown in FIG. 6(a) by a common dry etching device, thereby obtaining the glass substrate 3 as shown FIG. 6(b).

As shown in FIG. 6(b), as a result of the first dry etching, in the pit forming areas P1a and P2a, the glass substrate 3 whose surface has been uncovered is etched to a depth depending on etching power and etching time, and its thickness is reduced accordingly. On the other hand, in the groove forming area Ga, the glass substrate 3 is not etched, but a film thickness of the first residual resist film 4 is reduced by physical etching, forming a second residual resist film 5 which is thinner than the first residual resist film 4.

Figure 6C:
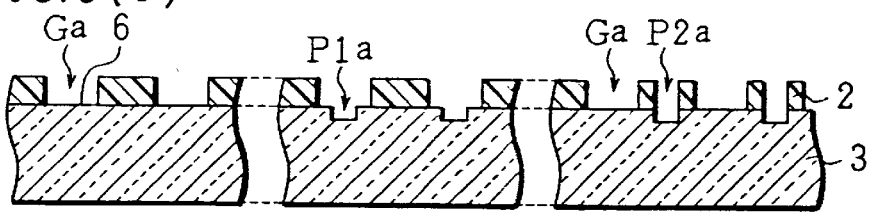

Next, first ashing is applied to the glass substrate 3 of FIG. 6(b) so as to obtain the glass substrate 3 of FIG. 6(c). Here, 'ashing' refers to dry etching which utilizes oxygen gas plasma. Namely, in the first ashing, oxygen gas is drawn into the dry etching device to dry etch the glass substrate 3 by oxygen gas plasma.

In the first ashing, etching on the glass substrate 3 does not progress, but it only results in removal of the photoresist 2 by ashing, and the film thickness thereof is uniformly reduced. In addition, the first ashing is set to continue until the second residual resist film 5 of the groove forming area Ga is completely removed. Therefore, after the first ashing, a smooth glass surface 6 (surface of the glass substrate 3) appears in the groove forming area Ga.

Next, second dry etching is applied to the glass substrate 3 of FIG. 6(c) so as to obtain the glass substrate 3 of FIG. 6 (d). In the second dry etching, the surface of the glass substrate 3 in the groove forming area Ga and the pit forming areas P1a and P2a is simultaneously etched to a predetermined depth in accordance with the etching power and etching time. Further, in the groove forming area Ga, a glass surface 7 which results after the etching becomes smooth by the etching of the smooth glass surface 6.

Figure 6D:
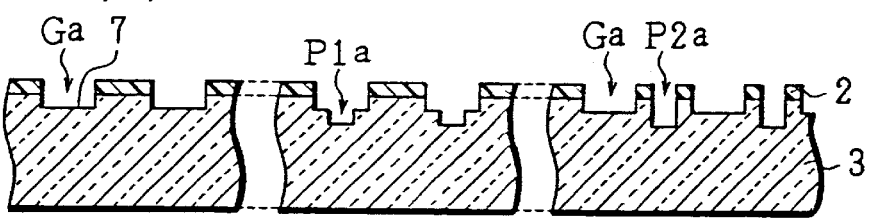
Figure 6E:
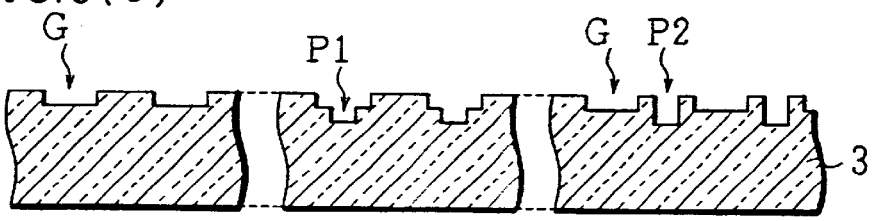

Finally, the residual photoresist 2 on the glass substrate 3 is removed by applying the second ashing to the glass substrate 3 of FIG. 6(d), thereby, as shown in FIG. 6(e), finishing the present master disk made up of the glass substrate 3 having the groove area G and the address pits P1 and P2.

As explained, in the present manufacturing method, the exposing and developing processes are set to make the first residual resist film 4 remain in the groove forming area Ga. In addition, it is also set that the residual resist over the groove forming area Ga be removed by the first ashing.

Accordingly, it is set that only the pit forming areas P1a and P2a be etched by the first dry etching, while by the second dry etching both of the groove forming area Ga and the pit forming areas P1a and P2a be etched.

In other words, in the present manufacturing method, the groove forming area Ga is etched only once, while the pit forming areas P1a and P2a are etched twice. Thus, the address pits P1 and P2 can be formed deeper than the groove area G.

Further, in the present manufacturing method, the groove area G and the address pits P1 and P2 are formed by etching the glass substrates 3 which was uncovered in the groove forming area Ga and the pit forming areas P1a and P2a, thereby easily forming the groove area G and the address pits P1 and P2 into a smooth rectangular shape and with a desired size.

Further, in the present manufacturing method, the same process is applied to the pit forming areas P1a and P2a. As a result, the depths of the address pits P1 and P2 can have substantially the same value.

Further, in the present manufacturing method, only a single layer of the photoresist 2 is employed as a resist to coat the glass substrate 3. Therefore, no intermediate layer which is removed afterward is necessary. This makes it possible to efficiently manufacture the present disk at low cost.

Additionally, since the groove depth $d_G$ and pit depth $d_P$ can be determined only by an etching condition of the first and second dry etching, the master disk having a desired shape can be manufactured with good reproducibility.

Note that, reactive dry etching using a gas such as $CF_4$ or $CHF_3$ can be adopted as the first and second dry etching in the etching process of the present manufacturing method.

Further, the first ashing is a process to uniformly and accurately remove the photoresist 2, and therefore, it is difficult to adopt other methods except ashing. However, since the second ashing is to remove the residual photoresist 2, the photoresist 2 can be removed by using solvents such as acetone, instead of the second ashing.

Further, as discussed, in the first dry etching, the physical etching on the photoresist 2 progresses simultaneously with the reactive etching on the glass substrate 3. Hence, it is preferable to set the film thickness of the first residual resist film 4 to leave the second residual resist film 5 within the groove forming area Ga after the first dry etching. The film thickness of the first residual resist film 4 can be controlled by adjusting the intensity of the light beam LB1 in the exposing process.

Further, as shown in FIG. 6(a), the glass substrate 3 after the developing process has the same resist pattern as in the structure of the present disk substrate 1. Accordingly, the glass substrate 3 in this state can be used as the master disk.

However, the following problem arises when the present disk substrate 1 is manufactured by using the glass substrate 3 having the photoresist 2 as shown in FIG. 6(a) as the master disk: in a magneto-optical disk including the disk substrate 1 thus manufactured, recording/reproducing characteristics deteriorate due to increase in noise (groove noise) at the time of recording and reproducing with respect to a groove, which prevents high-density recording.

The following will explain how the groove noise is increased. Note that, in FIGS. (5) through 5(c), for ease of explanation, the exposed portion F in the groove forming area Ga is shown substantially in a rectangular shape.

However, since the light beam LB1 which is converged and projected has a Gaussian intensity distribution, the exposed portion F in the groove forming area Ga actually has a curved shape in accordance with the Gausian distribution, but not the rectangular shape.

Furthermore, since exposure with respect to the groove forming area Ga is performed incompletely, the smooth surface of the glass substrate 3 does not appear in the groove forming area Ga after development, but the first residual resist film 4 whose surface has fine irregularities is formed. Accordingly, when adopting the glass substrate 3 of FIG. 6(a) as the master disk, the groove area G is produced by the first residual resist film 4 which is not smooth, thereby generating a loud groove noise.

In order to solve the foregoing problem, as a result of research on manufacturing of a master disk of a magneto-optical recording medium, the inventors of the present application have newly discovered that an addition of the foregoing etching process to the present manufacturing method can solve the problems of the curve of the first residual resist film 4 in the groove forming area Ga and of the increase in the groove noise.

The following will explain again the present manufacturing method with reference to FIGS. 7(a) through 7(d), taking into account an actual intensity distribution of the light beam LB1. Note that the following will explain exposing, developing and etching processes with respect to the groove forming area Ga and the second pit forming area P2a of the glass substrate 3.

Figure 7A:
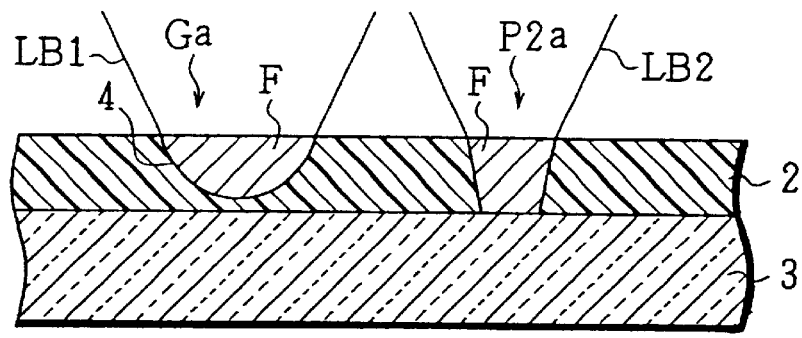
FIGS. 7(a) through 7(d) are explanatory drawings showing the foregoing etching process, taking into account an actual distribution of intensity of a light beam.

FIG. 7(a) is an explanatory drawing showing the exposing process of the present manufacturing method, in which the light beams LB1 and LB2 are converged and projected on the photoresist 2. As explained, the light beam LB1 has the Gausian intensity distribution, and the intensity of the light is set to be sufficiently weak so as not to completely expose the photoresist 2. For this reason, as shown in FIG. 7(a), the exposed portion F in the groove forming area Ga has a curved shape, and does not reach the glass substrate 3.

On the other hand, the intensity of the light beam LB2 is set to be sufficiently strong so as to completely expose the photoresist 2. Therefore, the exposed portion F in the second pit forming area P2a reaches the glass substrate 3.

Namely, the exposing process causes the photoresist 2 to have locally different exposed states in the groove forming area Ga and the second pit forming area P2a.

Figure 7B:
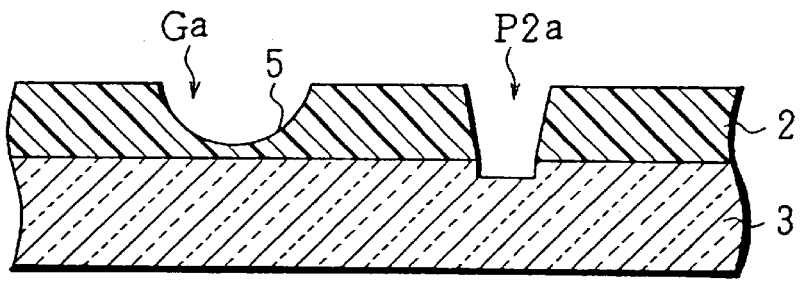

Further, as shown in FIG. 7(b), by developing the foregoing photoresist 2 in the developing process, the photoresist 2 of the exposed portion F is removed. Then, as shown in FIG. 7(b), the photoresist 2 in the second pit forming area P2a is completely removed by the developing process, and a smooth surface of the glass substrate 3 appears.

On the other hand, the first residual resist film 4 having a surface with fine irregularities and having a shape along the curve of the exposed portion F is formed in the groove forming area Ga. Accordingly, the groove forming area Ga immediately after the developing process does not have a desired shape for performing a desirable land and groove recording, i.e. a flat rectangular shape.

Figure 7C:
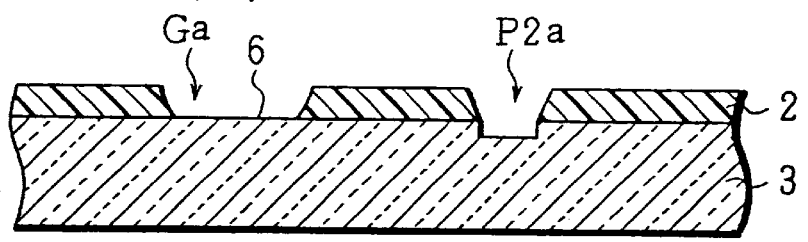
Figure 7D:
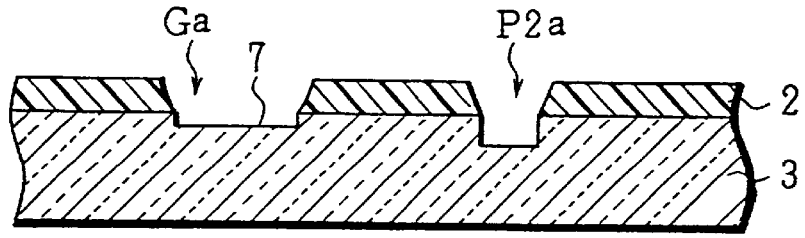

Here, in the present manufacturing method, the etching process as shown in FIGS. 6(a) through 6(e) is applied to the glass substrate 3, thereby obtaining the groove forming area Ga having a flat rectangular shape as shown in FIGS. 7(b) through 7(d).

More specifically, first, by applying the first dry etching to the glass substrate 3 immediately after the development, the surface of the glass which appeared in the second pit forming area P2a is etched so as to obtain the glass substrate 3 of FIG. 7(b). In addition, as shown in FIG. 7(b), the second residual resist film 5 having a curved pattern like the first residual resist film 4 is formed in the groove forming area Ga by the first dry etching.

Next, the first ashing is performed on the glass substrate 3 of FIG. 7(b) so as to remove and reduce the film thickness of the entire photoresist 2 to a uniform depth. As a result, as shown in FIG. 7(c), the second residual resist film 5 is completely removed, and the smooth glass surface 6 appears in the groove forming area Ga.

Next, the second dry etching is performed on the glass substrate 3 of FIG. 7(c) so as to obtain the glass substrate 3 of FIG. 7(d). As shown in FIG. 7(d), by etching the glass surfaces in the groove forming area Ga and the second pit forming area P2a, the groove forming area Ga having a smooth glass surface 7, and the second pit forming area P2a which is etched deeper than the groove forming area Ga can be formed.

Finally, the residual photoresist 2 remaining on the glass substrate 3 is completely removed by the second ashing to finish the present master disk (etching master disk).

A stamper which is obtained by electroforming the master disk thus produced, and the present disk substrate 1 of resin which is produced by injection molding with the stamper, include, like the present master disk, a groove area G having a flat rectangular shape (rectangular pattern), and address pits P1 and P2 which are deeper than the groove area G and which have substantially the same depth from the surface of the land area L.

Consequently, by using the present disk substrate 1, a magneto-optical disk having preferable recording and reproducing characteristics with a small groove noise which can obtain preferable address information can be produced.

Note that, it is preferable that the first ashing is performed until a width of the glass surface 6 which appears in the groove forming area Ga becomes equal to a predetermined track pitch. Thus, by appropriately setting a position of the groove forming area Ga, the width of the groove area G and that of the land area L can be made substantially equal to each ocher with ease.

Next, the following will explain a spot diameter of the light beam LB1 in the exposing process of the present manufacturing method.

In the present manufacturing method, since the pit forming areas P1a and P2a are completely exposed in the exposing process, the widths (diameters) of the address pits P1 and P2 become substantially the same as the spot diameter of the light beam LB2. On the other hand, as shown in FIGS. 7(c) and 7(d), a width of the groove area G is determined in accordance with the width of the glass surface 6 which was uncovered by the first ashing.

Further, as shown in FIG. 7(c), since the residual resist films 4 and 5 are curved, the width of the glass surface 6 which appeared after the first ashing becomes smaller than the spot diameter of the light beam LB1. Accordingly, in order to obtain a groove area G of a particular width by the present manufacturing method, it is preferable to set the spot diameter of the light beam LB1 larger than the width of the groove area G, i.e. track pitch.

Hence, when $W_P$ is the track pitch, $\lambda_{LB1}$ the wavelength of the light beam LB1, and $NA_{LB1}$ the numerical aperture of the objective lens to focus the light beam LB1, a spot diameter $d_{LB1}$ of the light beam LB1 becomes $(\lambda_{LB1}/NA_{LB1})$. Therefore, $W_P$, $\lambda_{LB1}$, $NA_{LB1}$ and $d_{LB1}$ are preferably set to satisfy $$W_P < d_{LB1} = (\lambda_{LB1}/NA_{LB1}) \tag{1}.$$

Next, the following will explain a position and size of the address pits P1 and P2 in the present disk substrate 1.

Figure 8:
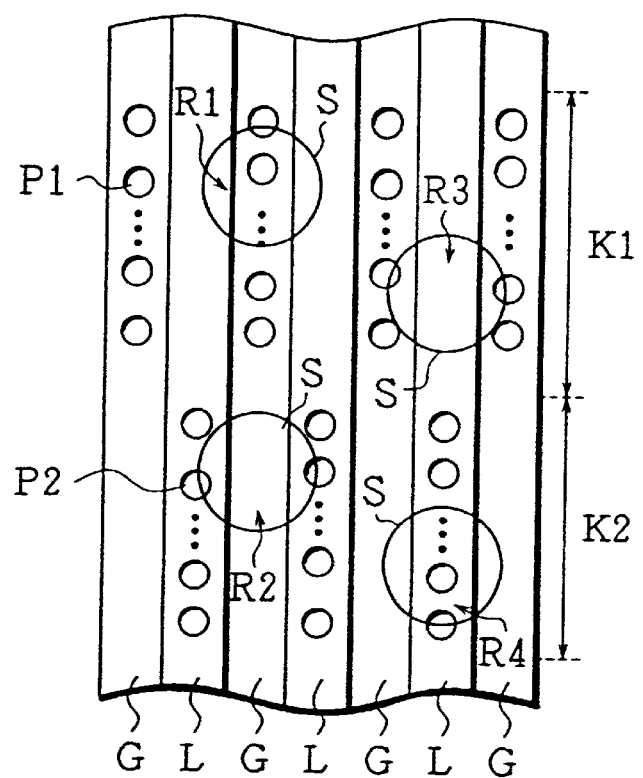
FIG. 8 is an explanatory drawing showing a state where a light beam spot is converged and projected onto a magneto-optical disk having the magneto-optical disk substrate of FIG. 1.
Figure 9:
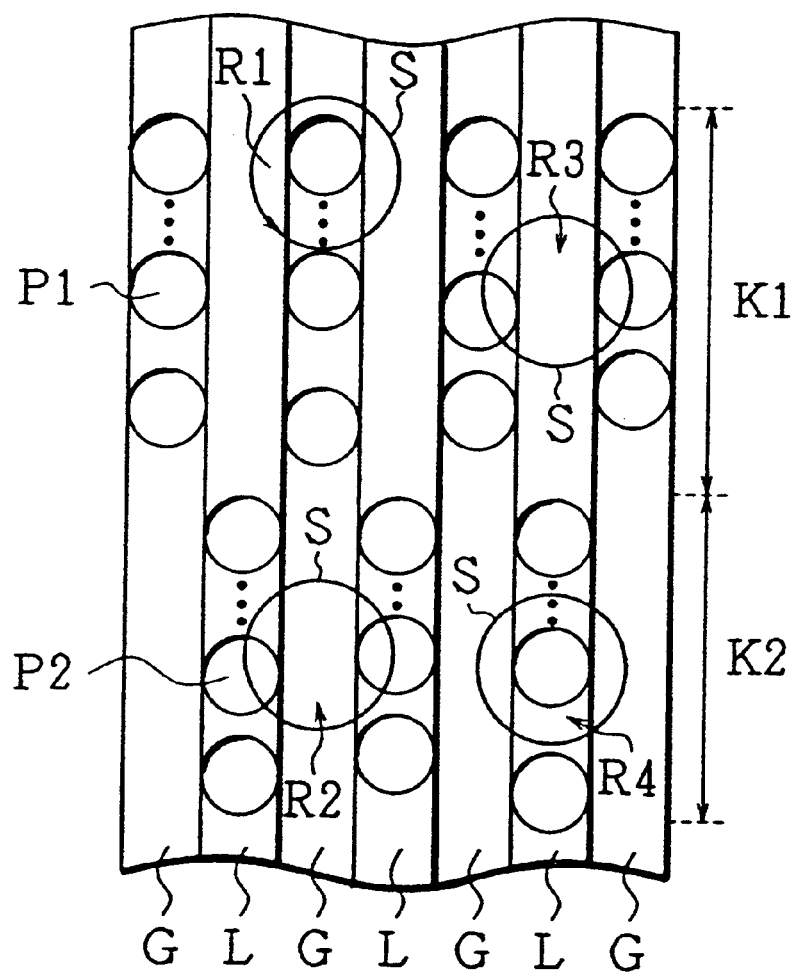
FIG. 9 is an explanatory drawing showing a state where the light beam spot is converged and projected onto a magneto-optical disk having address pits which have the same width as that of a groove area.

FIGS. 8 and 9 are explanatory drawings showing a state where a light beam spot S which is used in recording and reproducing is converged and projected on four different positions (R1–R4) on the address pits P1 and P2 of the present disk substrate 1.

In recording and reproducing, the light beam spot S scans by tracking either the groove area G or the land area L, following the rotation of the present disk substrate 1.

Referring to FIG. 8, when the light beam spot S is on R1 position of the groove area G, change in quantity of reflected light by the address pits P1 is detected and address information of the groove area G is read out. On the other hand, when the light beam spot S is on R2 position of the groove area G, change in quantity of the reflected light by the address pits P2 in the adjacent land areas L is detected, but this change is small and negligible.

Likewise, when the light beam spot S is on R4 position of the land area L, change in quantity of the reflected light by the address pits P2 is detected and address information of the land area L is read out. On the other hand, when the light beam spot S is on R3 position, change in quantity of the reflected light by the address pits P1 of the adjacent groove areas G is detected, but this change is small and negligible.

In this manner, in the present disk substrate 1 the groove pit area K1 which forms the address pits P1 in the groove areas G, and the land pit area K2 which forms the address pits P2 in the land areas L are different from each other. This enables address information in the groove area G and land area L to be reproduced stably.

Note that, should the address pits P1 and P2 be formed in the same area, changes in quantity of the reflected light by the address pits P1 and P2 are mixed by crosstalk, thereby failing to reproduce individual address information.

FIG. 9 is an explanatory drawing showing the case where the respective diameters of the address pits P1 and P2 are made larger than the pit of FIG. 8, and also substantially the same as the respective widths of the groove area G and land area L, i.e. the track pitch.

By thus setting the address pits P1 and P2 large, change in quantity of the reflected light thereby can further be increased. As a result, address information can be reproduced further stably.

In addition, like FIG. 8, even though the address pits P1 and P2 are thus increased, crosstalk between the respective changes in quantity of the reflected light can be prevented by separately forming the address pits P1 and P2 in the areas K1 and K2, respectively. As a result, it is possible to surely reproduce the individual address information.

Note that, since the address pits P1 and P2 are deep in the present disk substrate 1, disturbance of a push-pull signal (tracking signal) becomes large should the respective areas of the address pits P1 and P2 be exceedingly increased, which prevents correct tracking from being performed.

More specifically, change in quantity of the reflected light by the address pits P1 and P2 may cause disturbance of the push-pull signal for tracking. However, the present disk substrate 1 has excellent tracking characteristics because the rectangular and flat groove area G having a depth of about $\lambda/(8n)$ is continuously formed therein. Consequently, as shown in FIG. 9, when the respective diameters of the address pits P1 and P2 are made substantially the same as the track pitch, stable tracking can be performed by detecting the push-pull signal which is obtained from an area without the address pits P1 and P2.

However, when the respective diameters of the address pits P1 and P2 exceed the track pitch, change in quantity of the reflected light by the address pits P1 and P2 becomes exceedingly large. This results in large disturbance of the push-pull signal, which prevents stable tracking. Accordingly, it is preferable that the respective diameters of the address pits P1 and P2 in the present disk substrate 1 be not more than the track pitch, i.e. not more than the respective widths of the groove area G and land area L.

The following becomes evident from a review of the present manufacturing method by taking the foregoing into consideration: when $\lambda_{LB2}$ is a wavelength of the light beam LB2 for forming the address pits P1 and P2, and $NA_{LB2}$ a numerical aperture of the objective lens which focuses the light beam LB2, a spot diameter $d_{LB2}$ of the light beam LB2 can be represented as $(\lambda_{LB2}/NA_{LB2})$. Then, since the spot diameter $d_{LB2}$ is substantially equal to the respective diameters of the address pits P1 and P2 in the exposing process of the present manufacturing method, when $W_P$ is the track pitch of the present disk substrate 1. $\lambda_{LB2}$, $NA_{LB2}$, $d_{LB2}$ and $W_P$ are preferably set to satisfy $$(\lambda_{LB2}/NA_{LB2})=d_{LB2}\leq W_P \quad (2).$$

Further, from equations (1) and (2) above, $\lambda_{LB1}$, $d_{LB1}$, $NA_{LB1}$, $\lambda_{LB2}$, $NA_{LB2}$, and $d_{LB2}$ are preferably set to satisfy $$d_{LB1}=(\lambda_{LB1}/NA_{LB1})>d_{LB2}=(\lambda_{LB2}/NA_{LB2}) \quad (3).$$

Figure 10:
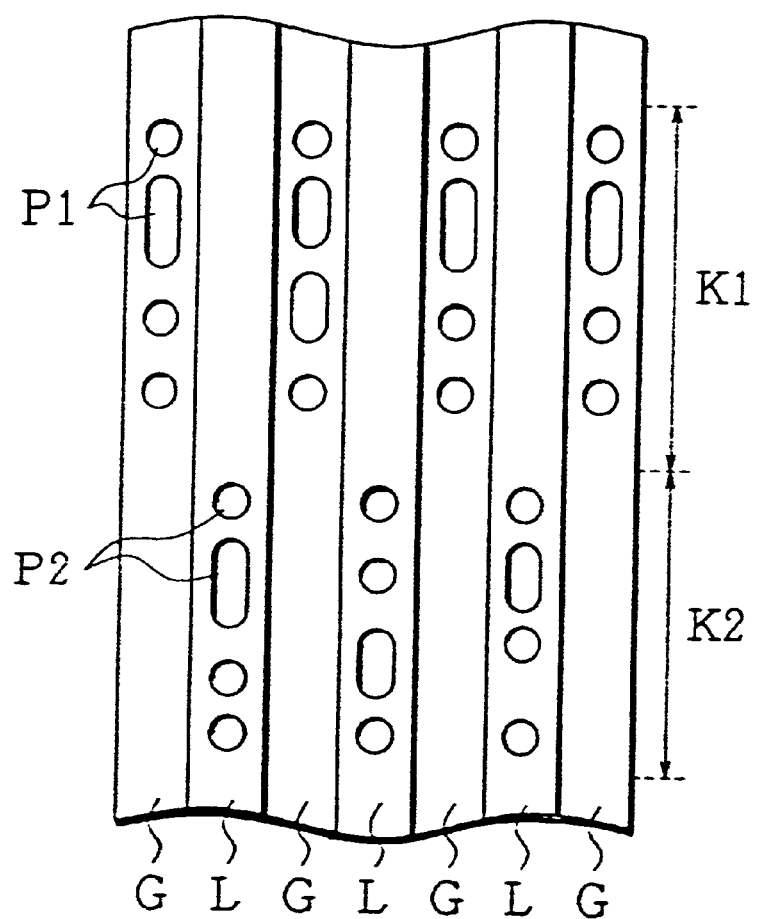
FIG. 10 is an explanatory drawing showing an elliptical address pit which can be formed on the disk substrate of FIG. 1.

Note that, the address pits P1 and P2 are represented as circular pits in FIGS. 1, 8 and 9 which were referred to in the First and Second Embodiments. However, as shown in FIG. 10, elliptical pits extending in the peripheral direction may be included in the address pits P1 and P2 which are deeper than the groove area G, and have substantially the same depth from the surface of the substrate. In that case, stable tracking and stable reproduction of address information can be attained by setting a width of the elliptical pit smaller than the track pitch.

Next, the following will introduce concrete manufacturing examples of the present disk substrate 1 according to the present manufacturing method, as examples.

EXAMPLES

The following will explain (i) the manufacturing examples of the present disk substrate 1 for which the cutting device 31 of FIG. 11 was used, and (ii) measurements for finding suitable groove depth $d_G$ and pit depth $d_P$ in the present disk substrate 1.

FIG. 11 is an explanatory drawing showing a structure of the cutting device 31. As shown in FIG. 11, the cutting device 31 includes: a light source 8, a first optical modulator 9, a total reflecting mirror 10, a first beam splitter 11, a total reflecting mirror 12, a second optical modulator 13, a first beam expander 14, a light shielding plate 15, a second beam splitter 16, a total reflecting mirror 17, an objective lens 18, a third optical modulator 19, an optical deflector 20, a second beam expander 21, a total reflecting mirror 22 and a turning table 30.

The light source 8 is a laser light source having a Kr gas laser. The optical modulator 9 is to control power of a light beam which is emitted from the light source 8. The first beam splitter 11 is to split the light beam of the light source 8 into the light beam LB1 for exposing the groove forming area Ga, and the light beam LB2 for exposing the pit forming areas P1a and P2a.

The optical modulators 13 and 19 are to control the respective power of the light beams LB1 and LB2. The first beam expander 14 is to expand a beam diameter of the light beam LB1 to a predetermined size. The light shielding plate (numerical aperture reducing section) 15 is to restrict the beam diameter of the light beam LB1 to a predetermined size by allowing only the central portion of the light beam LB1 to transmit so as to reduce the numerical aperture. Note that, the detailed structure of the light shielding plate 15 will be explained later.

Further, the optical deflector 20 is to move a focusing position of the second light beam LB2 between the first pit forming area P1a (center of the groove forming area Ga) and second pit forming area P2a. The second beam expander 21 is to expand the beam diameter of the light beam LB2 to a predetermined size.

Furthermore, the second beam splitter 16 is to synthesize the light beams LB1 and LB2. The turning table 30 is a rotatable table on which the glass substrate 3 to be made into the present master disk is placed.

More specifically, in the present cutting device 31, the laser light from the light source 8, after its power is controlled by the first optical modulator 9, changes its optical path by the total reflecting mirror 10, and then is split into the light beams LB1 and LB2 by the first beam splitter.

The light beam LB1 which has transmitted through the first beam splitter 11 is reflected by the total reflecting mirror 12, then, the power of the light beam LB1 is controlled again by the second optical modulator 13, and the beam diameter thereof is expanded to a predetermined size by passing through the first beam expander 14. After the light beam diameter is restricted by the light shielding plate 15, the light beam LB1 passes the second beam splitter 16, and is converged and projected on the glass substrate 3 placed on the turning table 30 via the total reflecting mirror 17 and objective lens 18.

Meanwhile, the power of the light beam LB2 which was reflected by the first beam splitter 11 is controlled by the third optical modulator 19, then, the light beam diameter of the light beam LB2 is expanded to a predetermined size by transmitting through the optical modulator 20 and second beam expander 21. Then, the light beam LB2 is reflected by the total reflecting mirror 22 and the second beam splitter 16 to be synthesized with the light beam LB1, and is converged and projected on the glass substrate 3 via the total reflecting mirror 17 and the objective lens 18.

Here, the following will explain the structure of the light shielding plate 15. FIGS. 12(a) and 12(b) are a plan view and a cross sectional view of the light shielding plate 15. As shown in FIG. 12(b), the light shielding plate 15 reflects (or absorbs) an edge portion of an incident light beam 25, while allowing the center of the incident light beam 25 to transmit so as to emit a transmitted light beam 26. In addition, the light shielding plate 15 has an arrangement in which a metallic film 24 for preventing transmission of the light is provided on a glass substrate 23 having light transmissivity.

Thus, the diameter of the transmitted light beam 26 emerging from the light shielding plate 15 becomes smaller than that of the incident light beam 25. Accordingly, $NA_{LB1} < NA_{LB2}$, where $NA_{LB1}$ represents the effective numerical aperture of the objective lens 18 with respect to the light beam LB1 which transmits through the light shielding plate 15, and $NA_{LB2}$ the effective numerical aperture of the objective lens 18 with respect to the light beam LB2 which does not transmit through the light shielding plate 15.

Here, when λ is the wavelength of the light beam, the spot diameters $d_{LB1}$ and $d_{LB2}$ of the light beams LB1 and LB2 are represented respectively as $d_{LB1} = \lambda/NA_{LB1}$, and $d_{LB2} = \lambda/NA_{LB2}$. Therefore, by providing the light shielding plate 15 within the optical path of the light beam LB1 as in the cutting device 31, the two light beams LB1 and LB2 which satisfy the condition of $d_{LB1} > d_{LB2}$ shown in equation (3) above can apparently be formed.

Figure 13A:
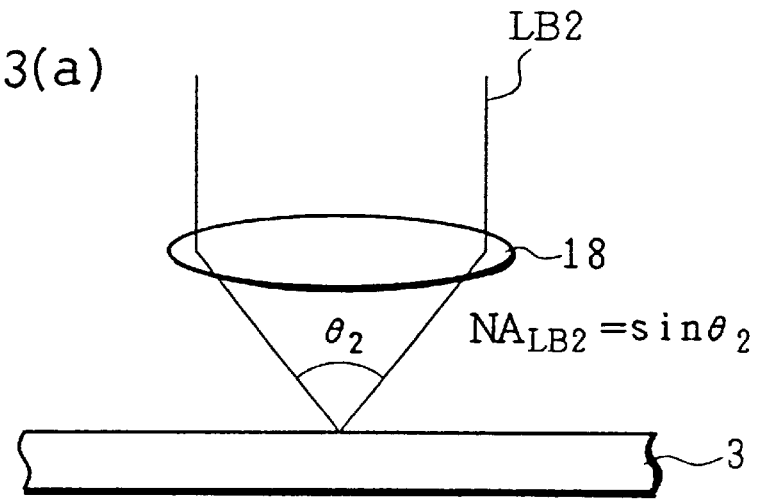
FIGS. 13(a) and 13(b) are explanatory drawings showing a numerical aperture of two light beams which are generated by the cutting device of FIG. 11.
Figure 13B:
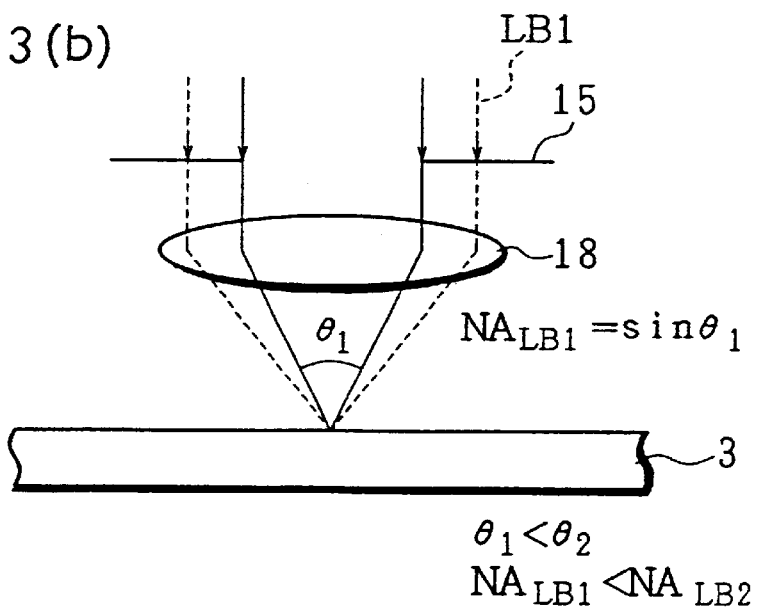
Figure 14:
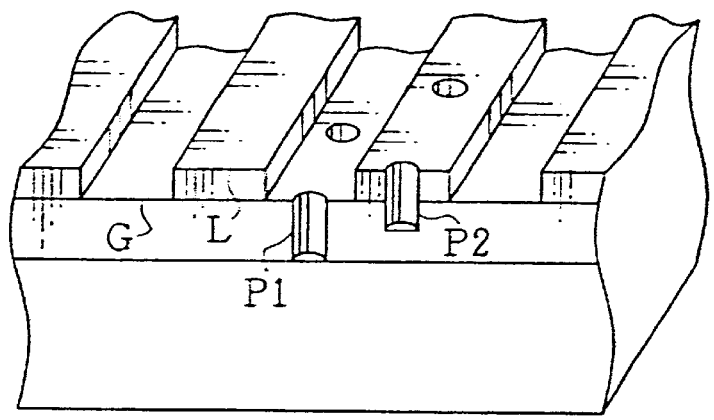
FIG. 14 is an explanatory drawing showing a structure of a conventional magneto-optical disk.
Figure 15:
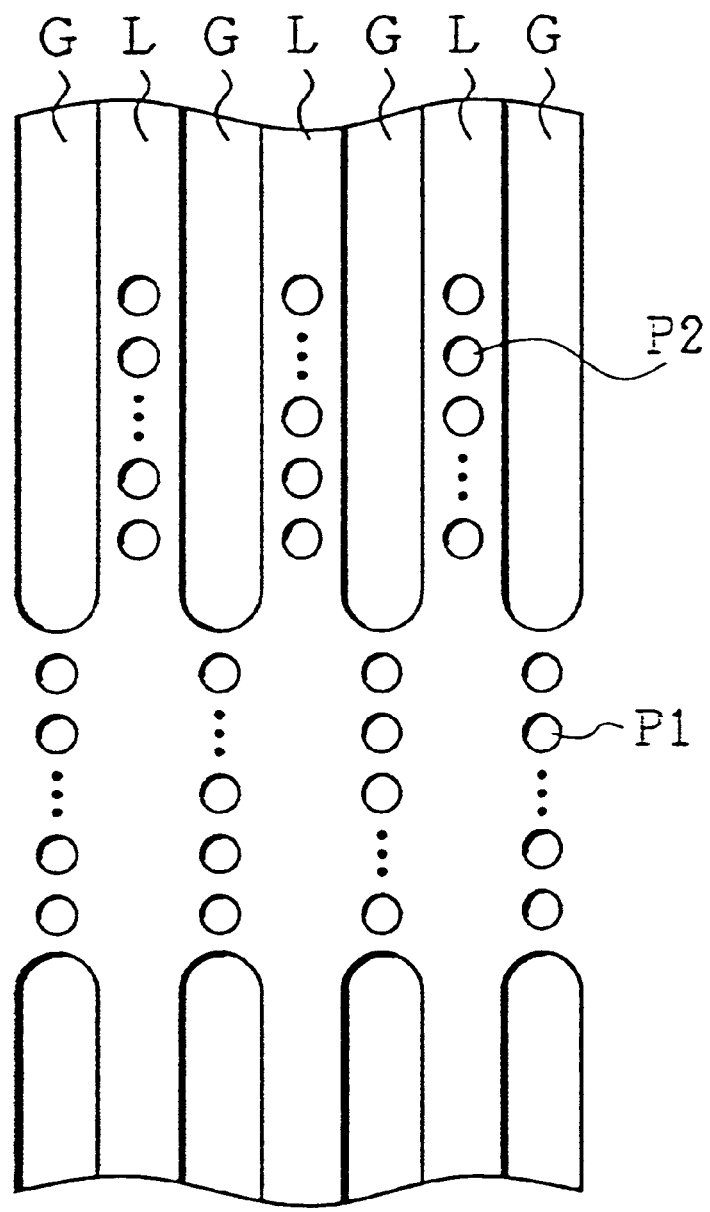
FIG. 15 is an explanatory drawing showing a structure of another conventional magneto-optical disk.

Further, the following will explain the numerical apertures $NA_{LB1}$ and $NA_{LB2}$ of the light beams LB1 and LB2. As shown in FIGS. 13(a) and 12(b), the numerical apertures $NA_{LB1}$ and $NA_{LB2}$ are sines of the stopped-down-aperture angles $\theta_1$ and $\theta_2$ (sin $\theta_1$ and sin $\theta_2$) of the light beams LB1 and LB2 from the objective lens 18 onto the glass substrate 3. Consequently, narrowing the optical path of the light beam LB1 by the light shielding plate 15 results in $\theta_1 < \theta_2$, thereby realizing the relation of $NA_{LB1} < NA_{LB2}$.

Next, the following will explain a production of the present master disk using the cutting device 31.

First, in the present embodiment, the photoresist 2 (XXX S1400 manufactured by XXXXX) having the film thickness of 300 nm was applied by the spin-coating method over the glass substrate 3 made of quartz glass which has been polished with high accuracy. Thereafter, the glass substrate 3 was pre-baked for 30 minutes at 95° C.

Then, the glass substrate 3 was placed on the turning table 30, and each member of the cutting device 31 was set to make the spot diameters of the light beams LB1 and LB2 to be 0.6 μm and 0.37 μm, respectively. Then, the photoresist 2 was exposed under the condition where the track pitch became 0.5 μm.

As a result, after development, the first residual resist film 4 (see FIG. 7(a)), which is a curved photoresist pattern having a surface groove width of 0.62 μm and the deepest groove depth of 200 nm, was formed in the groove forming area Ga.

On the other hand, in the pit forming areas P1a and P2a, a photoresist pattern to make the exposed portion having a diameter of 0.3 μm on the surface of the glass substrate 3 was formed. Note that, here, the amount of exposure with respect to the first pit forming area P1a was set to be smaller than the amount of exposure with respect to the second pit forming area P2a.

Next, the glass substrate 3 after development was post-baked for 30 minutes at 95° C. and was placed in a horizontal flat-type dry etching device (not illustrated). Then, after evacuating the dry etching device, a $CF_4$ gas was drawn therein, and the first dry etching was performed by feeding high frequency power of 400 W under the condition of the gas pressure of 5 m Torr.

By the first dry etching, the glass surfaces in the pit forming areas P1a and P2a were etched to the depth of 52.5 nm, respectively. Further, the second residual resist film 5 with the film thickness of 50 nm (see FIG. 7(b)) remained in the groove forming area Ga.

Next, after evacuating the dry etching device again, an oxygen gas was drawn therein, and first ashing was performed by feeding high frequency power of 200 W under the condition of the gas pressure of 70 m Torr. By the first ashing, only the photoresist 2 was uniformly removed without etching the glass substrate 3. In addition, the first ashing was performed until the glass surface 6 having the width of 0.5 μm (see FIG. 7(c)) as with the track pitch appeared in the groove forming area Ga.

Next, after evacuating the dry etching device again, a $CF_4$ gas was drawn therein, and the second dry etching was performed by feeding high frequency power of 400 W under the condition of the gas pressure of 5 m Torr. By the second dry etching, a newly exposed glass surface 7 (see FIG. 7(d)) in the groove forming area Ga and the glass surfaces in the pit forming areas P1a and P2a were etched to the depth of 52.5 nm, respectively.

Next, after evacuating the dry etching device again, an oxygen gas was drawn therein, and the second ashing was performed by feeding high frequency power of 200 W under the condition of the gas pressure of 70 m Torr. This removed all the photoresist remaining on the glass substrate 3, thereby finishing the manufacture of the present master disk made of quartz glass.

In the presence master disk thus manufactured, the widths of the groove area G and land area L were both 0.5 μm, and the groove depth of the groove area G 52.5 nm. Further, the address pits P1 and P2 were formed to have a diameter of 0.3 μm, and the depth of 105 nm from the surface of the land area L, respectively.

Note that, in order to manufacture the present disk substrate 1 by using the present master disk (quartz etching master disk) manufactured as above, the following steps follow.

Namely, by forming an electroforming film made of Ni on the present master disk and by detaching the Ni electroforming film from the present master disk, an irregular pattern formed on the present master disk is transferred onto a surface of the Ni electroforming film. Afterward, injection molding of resin such as polycarbonate is performed using the Ni electroforming film as the stamper, thereby manufacturing the present disk substrate 1 from resin.

Further, an optical recording medium such as a magneto-optical disk can be obtained by forming a recording film on the irregular surface (surface where the groove area G and land area L are formed) of the present disk substrate 1.

Next, the following will explain the results of measurements on reproducing characteristics of address information, and tracking stability with respect to the magneto-optical disk having the present disk substrate 1.

In the present Example, the recording film according to a super-resolution magneto-optical recording system disclosed in Japanese Unexamined Patent Publication No. 320134/1997 (Tokukaihei 9-320134) was stacked onto the present disk substrate 1, and as shown in Table 1, samples #1 through #13 of the magneto-optical disk were manufactured. Then, the characteristics of these samples #1 through #13 were evaluated by reproducing them in a magneto-optical drive. Note that, the reproduction was conducted by projecting a recording and reproducing light beam on each sample from the side of the present disk substrate 1.

Note that, as shown in Table 1, the samples #1 through #13 are a magneto-optical disk having the groove depth $d_G$ and pit depth $d_P$ which are different from each other.

TABLE 1

| SAMPLE | $d_G$ (nm) | $d_P$ (nm) | P1 Reproducing Output (%) | P2 Reproducing Output (%) | Tracking |
|---|---|---|---|---|---|
| #1 | 18 | 105 | x | x | FAIL* |
| #2 | 25 | 40 | 15 | 60 | OK |
| #3 | 25 | 50 | 60 | 85 | OK |
| #4 | 25 | 105 | 100 | 115 | OK |
| #5 | 25 | 135 | 65 | 70 | OK |
| #6 | 25 | 150 | x | x | NG** |
| #7 | 40 | 105 | 95 | 110 | OK |
| #8 | 52.5 | 105 | 80 | 100 | OK |
| #9 | 80 | 95 | 20 | 65 | OK |
| #10 | 80 | 105 | 65 | 80 | OK |
| #11 | 80 | 135 | 55 | 85 | OK |
| #12 | 80 | 150 | x | x | NG** |
| #13 | 100 | 125 | x | x | FAIL* |

*No tracking was performed.
**A track jump due to unstable tracking occurred.

Further, Table 1 shows reproducing outputs from the address pit P1 and P2 (P1 reproducing output and P2 reproducing output) and success and failure of tracking in the respective samples #1 through #13. Note that, a 'FAIL' in the Tracking column means that tracking could not be performed at all, and an 'NG' means that, while tracking is possible, an unexpected track jump due to unstable tracking in the address pits P1 and P2 was observed.

Furthermore, the values of the P1 and P2 reproducing outputs were normalized with respect to the P2 reproducing output of sample #8 ($d_G$: 52.5 nm and $d_P$: 105 nm) of 100%.

Further, the magneto-optical drive used was equipped with a light pickup including a semiconductor laser light source having the wavelength of 630 nm, and an objective lens having the NA of 0.60. In addition, a polycarbonate having the refractive index of 1.5 was used as the material of the present disk substrate 1.

As shown in Table 1, with samples #1 and #13 having the groove depths $d_G$ of 18 nm and 100 nm, respectively, desirable P1 and P2 reproducing outputs could not be obtained, and tracking could not be performed. This is due to the exceedingly shallow or deep groove depth $d_G$, which prevents a desirable push-pull signal from being obtained.

Further, with samples #6 ($d_G$: 25 nm and $d_P$: 150 nm) and #12 ($d_G$: 80 nm and $d_P$: 150 nm), neither desirable P1 and P2 reproducing outputs nor stable tracking could be obtained. This is due to the exceedingly deep pit depth $d_P$, which distorts the push-pull signal from the groove area G.

On the other hand, with samples #2 through #5, and #7 through #11, which have the groove depth $d_G$ of 25 nm through 80 nm, and the pit depth $d_P$ of not more than 135 nm, desirable tracking was realized.

Conseauently, in order to perform tracking desirably, the groove depth $d_G$ and pit depth $d_P$ are preferably set to satisfy $$25 \text{ nm} \leq d_G \leq 80 \text{ nm} \tag{4}$$

and $$d_P \leq 135 \text{ nm} \tag{5}.$$

Further, with samples #2 ($d_G$: 25 nm and $d_P$: 40 nm) and #9 ($d_G$: 80 nm and $d_P$: 95 nm), P2 reproducing outputs of 60% and 65%, respectively, were obtained, and address information in the address pit P2 was accurately reproduced. However, P1 reproducing outputs became 15% and 20%, which were exceedingly small, and address information in the address pit P1 could not be reproduced.

This is because the address pit P1 was provided inside of the groove area G, which resulted in reduction in P1 reproducing output.

Namely, an effective depth $d_{P1E}$ (depth from the base of the groove area G: $d_{P1E}=d_{P1}-d_G$) of the address pit P1 of the samples #2 and #9 was 15 nm, and the P1 reproducing output became small due to such an exceedingly shallow $d_{P1E}$, thus preventing address information from being stably reproduced.

On the other hand, with samples #3 through #5 having the effective depth $d_{P1E}$ of address pit P1 of not less than 25 nm ($d_G$: 25 nm, $d_P$: 50 nm, 105 nm and 135 nm), though P1 reproducing output tended to become smaller than P2 reproducing output, P1 and P2 reproducing outputs of not less than 50% were obtained in either case, and address information was reproduced accurately.

In addition, address information was accurately reproduced, as with the samples #3 through #5, with samples #7 ($d_G$: 40 nm, $d_P$: 105 nm), #10 and #11 ($d_G$: 80 nm, $d_P$: 105 nm and 135 nm).

Accordingly, in order to realize accurate reproduction of address information as well as stable tracking, in addition to the foregoing equations (4) and (5), the effective depth $d_{P1E}$ of the address pit P1 is preferably set to satisfy $$25 \text{ nm} \leq d_{P1E} \tag{6}.$$

Note that, the results shown in Table 1 and equations (4) through (6) were obtained by using the magneto-optical drive having the light source of the wavelength of 630 nm, and the present disk substrate 1 made up of the polycarbonate substrate having the refractive index of 1.5. Therefore, when using a magneto-optical drive having a different light source wavelength, or when manufacturing the present disk substrate 1 with a different material, it is preferable to appropriately set the groove depth $d_G$ and pit depth $d_P$ in accordance with these wavelength and material.

That is, the groove depth $d_G$ can be represented by $d_G=\lambda_d/(k \cdot n)$, where $\lambda_d$ is the light source wavelength, n is the refractive index of the material of the substrate and k is an arbitrary positive number. Likewise, the pit depth $d_P$ can be represented by $d_P=\lambda_d/(k \cdot n)$, where $\lambda_d$ is the light source wavelength, n is the refractive index of the material of the substrate and k is an arbitrary positive number.

Consequently, from equations (4) an (5), in order to realize stable tracking, the groove depth $d_G$ and pit depth $d_P$ are preferably set to satisfy $$\lambda_d/(16.8n) \leq d_G \leq \lambda_d/(5.25n) \tag{7},$$

and $$d_P \leq \lambda_d/(3.1n) \tag{8}.$$

Further, in order to realize accurate reproduction of address information as well as stable tracking, in accordance with equations (7) and (8) and from equation (6), the effective depth $d_{P1E}$ of the address pit P1 is preferably set to satisfy $$\lambda_d/(16.8n) \leq d_{P1E} \tag{9}.$$

Note that, equations (4) through (6 can be solved by respectively substituting 630 nm and 1.5 in $\lambda_d$ and n of equations (7) through (9).

Further, in the present Example, the description is given through the case where the light beam for recording and reproducing is projected from the side of the present disk substrate 1. However, the direction of projecting the light beam is not limited to this, but the present disk substrate 1 can also be used when the light beam is projected from the side of the recording film.

For example, it is also possible to perform recording and reproducing by forming the recording film and an UV setting resin protective layer (protective film) on the present disk substrate 1, and by projecting the light beam from the side of the protective film. Note that, in this case, the recording and reproducing light transmits not through the present disk substrate 1 but through the protective film.

Accordingly, preferable ranges of the groove depth $d_G$ and pit depths $d_{P1}$ and $d_{P2}$ for attaining desirable tracking, and the effective depth $d_{P1E}$ of the first address pit P1 for desirably reproducing address information are set by equations (7) through (9), in which n is a refractive index of the protective film.

Further, it is also possible to perform recording and reproducing by forming only the recording film on the present disk substrate 1 and by projecting the light beam from the side of the recording film. Note that, in such an arrangement, the preferable ranges of the groove depth $d_G$ and pit depths $d_{P1}$ and $d_{P2}$, and the effective depth $d_{P1E}$ of the first address pit P1 are set by the foregoing equations (7) through (9), in which n is a refractive index of the air.

Further, in the present Embodiment, as the first and second ashing, dry etching using oxygen gas plasma has been adopted. However, the ashing in the present manufacturing method is not limited to this, but it can be any processes which prevent etching applied over the surface of the glass substrate 3 from progressing while removing the photoresist 2 by ashing.

Further, in the present Embodiment, the exposed portion F was formed into a spiral on the photoresist 2 on the glass substrate 3 in the exposing process of the present manufacturing method, but the shape of the exposed portion F is not limited to this, and it can also be formed in the form of a concentric circle. In this manner, an optical recording medium master disk having a groove area G and land area L in the form of a concentric circle can be manufactured.

Further, as discussed in the present Embodiment, the optical recording medium can be formed by providing the recording film on the irregular side of the present disk substrate 1, i.e. on the groove area G and land area L. Alternatively, it is also possible to obtain the optical recording medium by forming the recording film on the side of the present disk substrate 1 without irregularities.

Further, in the First and Second Embodiments, the present disk substrate 1 is described as a substrate for the optical recording medium according to the present invention. However, the substrate for the optical recording medium of the present invention is not limitedly used for the magneto-optical recording disk, but it can easily be applied to other substrates such as an optical disk and optical card as well.

Further, according to the etching process of the present manufacturing method discussed in the Second Embodiment, the depths $d_{P1}$ and $d_{P2}$ of the address pits P1 and P2 can in principle be set to have exactly the same depth. However, these depth $d_{P1}$ and $d_{P2}$ may slightly be different because there may be given slight variation in depth due to variation in etching distribution. Therefore, it is described in the Second Embodiment that the depth $d_{P1}$ and $d_{P2}$ of the address pits P1 and P2 are substantially equal to each other.

Further, in the First and Second Embodiments, the optical recording medium of the present invention includes the present disk substrate 1 of FIG. 1 having the groove area G, land area L and address pits P1 and P2, thereby reproducing address information accurately and stably.

However, not limited to the foregoing structure, the optical recording medium of the present invention may also have an arrangement in which the groove area G, land area L and address pits P1 and P2 are formed using resin, etc. on substantially a flat surface of the substrate. The same effects can be obtained by such an arrangement as in the case of using the present disc substrate 1.

Further, the intensity of the light beam LB1 may be changed so that the exposure of the photoresist applied over the groove forming area Ga becomes insufficient. In this case, as shown in FIG. 7(a), a smooth surface cannot be obtained because exposure and development are insufficient in the groove forming area Ga in which the first residual resist film 4 of the curved shape is formed. That is, with such a resist pattern (the first residual resist film 4), the rectangular and smooth groove area G required for the land and groove recording cannot be obtained.

Further, the optical modulator 21 of the cutting device 31 shown in FIG. 11 can be described as having a function of moving the focusing point of the second light beam LB2 between the centers of the groove forming area Ga and a portion where the land area L is to be formed.

Further, as shown in FIG. 9, when the diameter of the address pits P1 and P2 is substantially equal to the width of the groove area G or land area L, stable tracking was performed by detecting the push-pull signal which is obtained in an area without the address pits P1 and P2, though disturbance of the push-pull signal due to the address pits P1 and P2 was observed. However, when the diameter of the address pits P1 and P2 is increased to exceed the width of the groove area G or land area L, the push-pull signal is distorted, and tracking cannot be performed. Thus, in the present disk substrate 1, the diameters of the address pits P1 and P2 are preferably not more than the track pitch, i.e. not more than the width of the groove area G or land area L.

Further, when the recording film and the UV setting resin protective layer are formed on the present disk substrate and recording and reproducing is performed by exposing the light beam from the side of the protective layer, the refractive index n of the material of the substrate shown in Examples is used as the refractive index of the UV setting resin protective layer. In addition, when only the recording film is formed on the optical disk substrate and recording and reproducing is performed by exposing the light beam from the side of the recording film, the refractive index n of the material of the substrate shown in Examples is used as the refractive index of the air.

Further, it may be described that the optical recording medium master disk according to the present invention has an arrangement including a substrate in which a groove having the first address pit and a land having the second address pit are provided, where the groove depth $d_G$, and the depths $d_{P1}$ and $d_{P2}$ of the address pits P1 and P2 on the substrate are set to satisfy $d_G < d_{P1} \approx d_{P2}$.

Further, it may also be described that the present recording medium substrate according to the present invention has an arrangement including a groove having the first address pit and a land having the second address pit, where the groove depth $d_G$, and the depths $d_{P1}$ and $d_{P2}$ of the address pits P1 and P2 are set to satisfy $d_G < d_{P1} \approx d_{P2}$.

Further, it may also be described that the optical recording medium according to the present invention has an arrangement including the recording film, a groove having the first address pit and a land having the second address pit, where the groove depth $d_G$, and the depths $d_{P1}$ and $d_{P2}$ of the address pits P1 and P2 of the substrate are set to satisfy $d_G < d_{P1} \approx d_{P2}$.

Further, the present invention relates to an optical recording medium and a manufacturing method thereof for use in an optical recording and reproducing device capable of high-density information recording, and can be described as first through fourth optical recording media, first through fourth manufacturing methods of an optical recording medium master disk, a first cutting device, a first optical recording medium master disk, a first optical recording medium stamper and a first optical recording medium resin substrate, which will be described below.

That is, the first optical recording medium has an arrangement which includes a groove having a shape of a spiral or a concentric circle, a land between the grooves, and which performs recording and reproducing on each of the groove and land, wherein first and second address pits are provided in the groove and the land, respectively, and $d_G < d_{P1} \approx d_{P2}$ is satisfied where $d_{P1}$ is the depth of the first address pit and $d_{P2}$ the depth of the second address pit.

Accordingly, by having the address pit which is deeper than the groove depth, address information can be reproduced accurately. In addition, by setting the depth of the first address pit substantially equal to the depth of the second address pit, the groove and address pits of the present invention can be formed with good reproducibility using a first manufacturing method of an optical recording medium master disk, which will be discussed below.

The second optical recording medium has an arrangement in which, in the first optical recording medium, the first address pit provided in the groove and the second address pit provided in the land are not adjacent to each other in a radial direction.

Consequently, no crosstalk occurs between the first address pit provided in the groove and the second address pit provided in the land, thus reproducing address information accurately.

The third optical recording medium has an arrangement in which, in the first optical recording medium, when $\lambda_d$ is the wavelength of the recording and reproducing light of the optical recording medium, and n is the refractive index of the substrate of the optical recording medium, the groove depth $d_G$, the effective depth $d_{P1E}$ of the first address pit from the base of groove, depth $d_{P1}$ of the first address pit and depth $d_{P2}$ of he second address pit are represented as $(\lambda_d/16.8n) \leq d_G \leq (\lambda_d/5.25n)$, $d_{P1E} \geq (\lambda_d/16.8n)$, and $d_{P1} \approx d_{P2} \leq \lambda_d/3.1n$).

Accordingly, the groove depth, effective depth of the first address pit from the base of groove, depth of the first address pit and the depth of the second address pit are optimized, thereby realizing stable tracking and accurate reproduction of address information.

The first manufacturing method of the optical recording medium master disk, in order to produce the master disk for producing the substrates of the first to third optical recording media, includes the steps of:

applying a photoresist over a surface of a master disk substrate;

exposing the photoresist by a first light beam for exposing grooves and second light beam for exposing address pits;

developing the photoresist by adjusting intensity of the first and second light beams, so as to maintain the photoresist and not to uncover the surface of the master disk substrate in a groove area, and so as to completely remove the photoresist to uncover the surface of the master disk in an address pit area;

etching the surface of the master disk only in the address pit area by first dry etching;

uncovering the surface of the master disk in the groove area by first ashing;

etching the surface of the master disk in the groove and address pit areas by second dry etching; and removing the residual photoresist finally.

Accordingly, the smooth and rectangular groove which is shallower than the address pit can be formed. In addition, the depths of the groove and address pit can be determined only by an etching condition of the first and second etching processes, thus forming the groove and address pit having a desired depth with good reproducibility.

The second manufacturing method of the optical recording medium master disk, in the first manufacturing method of the optical recording medium master disk, is the method in which $d_{LB1} > d_{LB2}$, where $d_{LB1}$ is a diameter of a beam spot of the first light beam for exposing the grooves, and $d_{LB2}$ is a diameter of a beam spot of the second light beam for exposing the address pits.

Consequently, an address pit having a diameter or a width which is smaller than a track pitch can be formed, thereby performing stable tracking and stable reproduction of address information.

The third manufacturing method of the optical recording medium master disk, in the first manufacturing method of the optical recording medium master disk, is the method in which, when $d_{LB1}$ is the diameter of the beam spot of the first light beam for exposing the grooves, $W_P$ is the track pitch, $W_G$ is a groove area width, $W_L$ is a land area width, $W_P$, $W_G$ and $W_L$ are substantially the same, and further, $d_{LB1} > W_P$.

Accordingly, in the etching process of the present invention, the groove and land areas can be formed to have substantially the same width, thereby obtaining the optical recording medium for land and groove recording, in which recording and reproducing characteristics in the groove and land areas are substantially the same.

The fourth manufacturing method of the optical recording medium master disk, in the first manufacturing method of the optical recording medium master disk, is the method in which, when $d_{LB2}$ is the diameter of the beam spot of the second light beam for exposing the address pits, $W_P$ is the track pitch, $W_G$ is the groove area width, $W_L$ is the land area width, $W_P$, $W_G$ and $W_L$ are substantially the same, and further, $d_{LB2} \leq W_P$.

Consequently, the address pit having the diameter or the width which is smaller than the track pitch can be formed, thereby performing stable tracking and stable reproduction of address information.

Further, the first cutting device has an arrangement in which, in the first manufacturing method of the optical recording medium master disk, a cutting device for exposing the photoresist applied over the surface of the master disk substrate has the first light beam for exposing the grooves and second light beam for exposing the address pits, and a light shielding plate, which can reduce the numerical aperture (NA) with respect to the objective lens for converging and projecting the light beam on the surface of the photoresist, is inserted in the optical path of the first light beam.

Accordingly, the numerical aperture with respect to the first light beam for exposing the grooves can be made smaller than that with respect to the second light beam for exposing the address pits, and a beam spot diameter of the first light beam for exposing the grooves can be made larger than that of the second light beam for exposing the address pits.

Meanwhile, the first optical recording medium master disk is manufactured by the first manufacturing method of the optical recording medium master disk. In addition, the first optical recording medium stamper is manufactured by electroforming the first optical recording medium master disk. Further, the first optical recording medium resin substrate is manufactured by using the first optical recording medium stamper. Further, the fourth optical recording medium is manufactured by using the first optical recording medium resin substrate.

As discussed, the first optical recording medium of the present invention (the present recording medium) includes the groove having the first address pit and the land having the second address pit, in which the groove depth $d_G$, the first and second address pit depths $d_{P1}$ and $d_{P2}$ are set to satisfy $$d_G < d_{P1} \approx d_{P2} \quad (a).$$

The present recording medium is the optical recording medium, including the optical disk and magneto-optical disk such as CD (Compact Disc), for recording and reproducing information by the exposure of the light beam. Moreover, as explained, the present recording medium includes the address pits in both of the groove and land, thereby being the optical recording medium of the land and groove recording system in which both groove and land have the recording tracks.

Particularly, in the present recording medium, as indicated by equation (a) above, the first address pit provided in the groove and second address pit provided in the land are made deeper than the groove depth. This enables the reproduced signal from these address pits to be intense, thereby reproducing address information accurately and stably.

Further, in the present recording medium, as indicated by equation (a) above, the depth (from the surface of the land) of the first and second address pits are set at the values substantially equal to each other. Consequently, these two kinds of address pit can be manufactured by a single manufacturing process, and thus the present recording medium can be manufactured by a relatively facile process.

The second optical recording medium of the present invention, in the arrangement of the first optical recording medium, has an arrangement in which the first and second address pits are formed so as to prevent adjoining to each other.

In the foregoing structure, simultaneous reproduction of both of the first and second address pits (crosstalk) can greatly be suppressed, thereby reproducing address information more accurately.

The third optical recording medium of the present invention can readily be composed by stacking a predetermined recording film on the substrate (optical recording medium substrate) in which the foregoing groove and land are provided. In that case, the groove depth $d_G$, the first and second address pit depths $d_{P1}$ and $d_{P2}$ are set to satisfy $$\lambda_d/(16.8n) \leq d_G \leq \lambda_d/(5.25n) \quad (b)$$

$$d_{P1} \approx d_{P2} \leq \lambda_d/(3.1n) \quad (c)$$

in accordance with the refractive index n of the substrate material and the wavelength $\lambda_d$ of the recording and reproducing light.

Here, the recording and reproducing light is the light beam for performing recording or reproducing with respect to the present recording medium.

In the case where the groove depth $d_G$ does not fall within a range of equation (b), a good tracking signal from the groove cannot be obtained because of the exceedingly shallow or deep groove depth $d_G$. On the other hand, in the case where the pit depths $d_{P1}$ and $d_{P2}$ do not fall within a range of equation (c), stable tracking cannot be performed due to disturbance of the tracking signal caused by the exceedingly deep pit depths $d_{P1}$ and $d_{P2}$.

Consequently, in order to attain good tracking, the groove depth $d_G$ and pit depths $d_{P1}$ and $d_{P2}$ are preferably set to fall within the ranges of equations (b) and (c) above.

The fourth optical recording medium of the present invention, in the arrangement of the third optical recording medium, has an arrangement in which the first address pit effective depth $d_{P1E}$ (depth from the base of groove: $d_{P1E} = d_{P1} - d_G$) is set to satisfy $$d_{P1E} \geq (\lambda_d/16.8n) \quad (d).$$

When the first address pit is to be formed within the groove and when the first address pit effective depth $d_{P1E}$ does not fall within a range of equation (d), address information of the groove cannot be reproduced stably because the reproducing output from the first address pit is decreased due to the exceedingly shallow $d_{P1E}$.

Accordingly, in order to reproduce address information stably and accurately, the first address pit effective depth $d_{P1E}$ is preferably set to fall within the range of equation (d) above.

The fifth optical recording medium of the present invention, in the arrangement of the first optical recording medium, has a stacked structure of the substrate on which the groove and land are formed, a recording film and protective film, and recording and reproducing light is projected from a side of the protective film, and the groove depth $d_G$ and the first and second address pit depths $d_{P1}$ and $d_{P2}$ are set to satisfy $$\lambda_d/(16.8na) \leq d_G \leq \lambda_d/(5.25na)$$

$$d_{P1} \approx d_{P2} \leq \lambda_d/(3.1na)$$

in accordance with the refractive index na of the protective film and the wavelength $\lambda_d$ of the recording and reproducing light.

The protective film for protecting the recording film is preferably provided on the recording film. In addition, when performing recording and reproducing with respect to the present recording medium by the recording and reproducing light which is projected from the side of the protective film, the recording and reproducing light is Transmitted not through the substrate but through the protective film.

Accordingly, preferable ranges of the groove depth $d_G$ and pit depths $d_{P1}$ and $d_{P2}$ for attaining good tracking, and the first address pit effective depth $d_{P1E}$ are preferably determined by $$\lambda_d/(16.8na) \leq d_G \leq \lambda_d/(5.25na) \quad (e)$$

$$d_{P1} \approx d_{P2} \leq \lambda_d/(3.1na) \quad (f)$$

$$d_{P1E} \geq \lambda_d/(16.8na) \quad (g)$$

in accordance with the refractive index na of the protective film and the wavelength $\lambda_d$ of recording and reproducing light.

Further, a first manufacturing method (present manufacturing method) of an optical recording medium master disk in which address pits are provided in both of the land and groove, includes the steps of: (a) applying a resist over a master disk substrate; (b) performing exposure and development with respect to the substrate so as to partially maintain the resist in the groove forming area, while avoiding remaining resist in the pit forming area; (c) etching a surface of the substrate which is uncovered in the pit forming area; (d) uncovering the surface of the substrate in the groove forming area; and (e) etching the surface of the substrate in both of the groove forming and pit forming areas.

The present manufacturing method is for manufacture of an optical recording medium master disk (hereinafter simply referred to as master disk) which is used to manufacture a substrate used in the optical recording medium. Namely, the foregoing substrate of the optical recording medium is manufactured by injection molding of a substrate material such as resin, in which a stamper obtained from the master disk is used as a mold.

Consequently, the master disk has the same arrangement as that of the optical recording medium substrate (including a groove, land and address pit, etc.).

Further, as explained, the present manufacturing method is set to manufacture the master disk having the address pits in both of the groove and land. Therefore, the substrate of the optical recording medium which is manufactured from this master disk is to be adopted in an optical recording medium of a land and groove recording system.

Further, the groove forming area refers to a portion of the master disk substrate (substrate to be the master disk) where the groove is formed, and likewise, the pit forming area refers to a portion of the master disk substrate where the address pit is formed.

Meanwhile, in the present manufacturing method, the step (b) is set such that the resist partially remains in the groove forming area, while preventing the resist from remaining in the pit forming area.

Further, in the first dry etching process performed after this step, the surface of the substrate which appeared in the pit forming area is etched. On the other hand, since the resist is remaining in the groove forming area, etching by the first dry etching process is avoided therein.

Therefore, at the end of the first dry etching process, the pit forming area of the master disk substrate is deeper by the depth of etching than the groove forming area.

Then, in the present manufacturing method, after the residual resist in the groove forming area is removed by the first ashing process, the groove and address pit are formed by the second dry etching process by etching the master disk substrate appeared in the groove forming and pit forming areas.

As explained, in the present manufacturing method, only the wit forming area is etched in the first dry etching process, while both of the groove forming and pit forming areas are etched in the second dry etching process. Namely, in the present manufacturing method, the groove forming area is etched only once, while the pit forming area is etched twice, thereby forming the address pit deeper than the groove.

Further, in the present manufacturing method, the groove and address pits are formed by etching the master disk substrate appeared in the groove forming and pit forming areas. Accordingly, the groove and address pits are formed into a flat rectangular shape, and it is possible to manufacture the optical recording medium master disk which can suppress groove noise of the optical recording medium, compared with a care where the groove and address pits were formed on the surface having fine irregularities.

Further, in the present manufacturing method, the resist applied onto the master disk substrate is a single layer without an intermediate layer which is to be removed afterward, thereby efficiently manufacturing the master disk at low cost.

Additionally, since the depth of the groove and address pits of the master disk can be determined only by the etching conditions of the first and second dry etching processes, the master disk having a desired shape can be manufactured with good reproducibility.

Note that, it is preferable that the present manufacturing method includes a second ashing process to remove the residual resist on the master disk substrate after the second dry etching process. The 'ashing' here refers to a process such as dry etching employing oxygen gas plasma for example, which prevents the surface of the master disk substrate from being further etched, while removing by ashing the resist on the master disk substrate.

In the second manufacturing method of the optical recording medium master disk, in the arrangement of the first manufacturing method, the step (b) of exposure and development is preferably set so that the groove forming area is exposed by the first light beam, while the pit forming area is exposed by the second light been having the spot diameter which is smaller than that of the first light beam.

In the foregoing arrangement, since an exposing width in the pit forming area of the master disk can be made smaller than the groove forming area, the width of the address pit can be made smaller than the groove width. Therefore, in an optical recording medium manufactured from this master disk, the quantity of the tracking signal obtained from the groove can be made larger with respect to change in quantity of reflected light obtained from the address pit, thereby realizing stable tracking.

In the third manufacturing method of the optical record medium master disk according to the present invention, in the arrangement of the first manufacturing method, the step (b) of exposure and development is set so that the groove forming area is exposed by the first light beam having the spot diameter which is larger than the track, and the step (d) of first ashing is set so that the width of the surface of the substrate which was uncovered on the groove forming area in the first ashing process is made substantially the same as the track pitch.

Usually, in the optical recording medium of a land and groove system, the groove width is substantially the same as the land width, which is set as the track pitch of the optical recording medium. In addition, in the foregoing method, the groove forming area is exposed by the first light beam having the spot diameter which is larger than the track pitch, i.e. the groove width.

This is due to the following reasons: since the light beam usually has the Gausian intensity a distribution, the exposed portion in the groove forming area, where exposure and development are performed in such a manner that the resist remains to avoid uncovering the surface of the master disk substrate, has a curved shape (having a small base area like a mortar) in accordance with the Gausian distribution, but not the rectangular shape. Accordingly, the base of the exposed portion becomes smaller than the spot diameter of the first light beam.

Further, the first ashing process is performed on a portion in the vicinity of the base of the resist thus having the curved shape.

On the other hand, the groove width of the master disk is determined by the width of the surface of the master disk substrate which was uncovered by the first ashing process. Therefore, in the first ashing process, the uncovered surface of the master disk substrate is preferably set to have a width which is about the same as the track pitch. Accordingly, in the exposing and developing process, the base area of the resist to be maintained in the groove forming area is preferably set to have a width which is about the same as the track pitch.

Thus, the spot diameter of the first light beam which is larger than the base of the resist is preferably set to be larger than the track pitch.

In the fourth manufacturing method of the optical recording medium master disk according to the present invention, in the third manufacturing method, the step (b) of exposure and development is set so that the pit forming area is exposed by the second light beam having the spot diameter which is not larger than the track pitch.

In the pit forming area where exposure and development are performed not to maintain the resist, the exposed portion takes a rectangular shape where the base is the surface of the master disk substrate. In addition, the width of the base becomes almost the same as the spot diameter of the second light beam. Therefore, in the pit forming area, the width made by etching in the first and second dry etching processes is almost the same as the spot diameter of the second light beam. Accordingly, by setting the spot diameter not to be larger than the track pitch as in the foregoing arrangement, it is possible to prevent the address pit width from becoming larger than the track pitch, i.e. the groove.

Further, in the foregoing manufacturing method of the present invention, it is preferable to utilize the cutting device having an arrangement which includes a beam splitter for splitting the light beam which is emitted from the light source into the first and second light beams, the objective lens for converging the first and second light beams, and a numerical aperture reducing section for reducing the numerical aperture of the objective lens with respect to the first light bear.

With this cutting device of the foregoing arrangement, the first and second light beams can be generated from a single light source, and the numerical aperture of the objective lens with respect to the first light beam can be reduced by the numerical aperture reducing section.

The spot diameter of the light beam becomes λ/NA when λ is the wavelength of the light beam, and NA is the numerical aperture with respect to the light beam. Therefore, by reducing the numerical aperture, the spot diameter of the light beam can be increased. Accordingly, by using the foregoing cutting device, the first and second light beams having different spot diameters can readily be generated.

Note that, as the numerical aperture reducing section, for example, a light shielding plate which reduces the diameter of the first light beam can be adopted.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical recording medium, which includes a groove and a land, and further includes a first pit indicating a groove address information and a second pit indicating a land address information, wherein:

recording tracks are formed in both the groove and the land, and a groove pit area and a land pit area are two different areas separated in a peripheral direction, and a groove depth $d_G$, a first pit depth $d_{P1}$ and a second pit depth $d_{P2}$ are set to satisfy $$d_G < d_{P1} \approx d_{P2}.$$

2. The optical recording medium as set forth in claim 1, wherein:

when n is a refractive index of a substrate on which said groove and said land are formed, and γ is a wavelength of a laser light for recording and reproducing, $$d_{P1} \approx d_{P2} \approx \gamma/(4n)$$

$$d_G \approx \gamma/(8n)$$

are satisfied.

3. The optical recording medium as set forth in claim 1, wherein said groove and said land have substantially the same width, and are set to a predetermined track pitch.

4. The optical recording medium as set forth in claim 1, wherein a diameter of said first and second address pits is not more than a predetermined track pitch.

5. The optical recording medium as set forth in claim 1, which is made up of said substrate on which said groove and said land are formed and a recording film, wherein:

said groove depth $d_G$, first address pit depth $d_{P1}$ and second address pit depth $d_{P2}$ are set to satisfy $$\lambda_d/(16.8n) \leq d_G \leq \lambda_d/(5.25n)$$

$$d_{P1} \approx d_{P2} \leq \lambda_d/(3.1n)$$

in accordance with a refractive index n of a material of said substrate, and a wavelength $\lambda_d$ of recording and reproducing light.

6. The optical recording medium as set forth in claim 5, wherein a depth $d_{P1E}$ from a base of said groove in said first address pit satisfies $$d_{P1E} \geq \lambda_d/(16.8n.$$

7. The optical recording medium as set foith in claim 1, wherein:

said optical recording medium has a stacked structure of said substrate on which said groove and land are formed, a recording film and a protective film, and recording and reproducing light is projected from a side of said protective film, and said groove depth $d_G$, first address pit depth $d_{P1}$ and second address pit depth $d_{P2}$ are set to satisfy $$\lambda_d/(16.8na) \leq d_G \leq \lambda_d/(5.25na)$$

$$d_{P1} \approx d_{P2} \leq \lambda_d/(3.1na)$$

in accordance with a refractive index na of said protective film, and a wavelength $\lambda_d$ of the recording and reproducing light.

* * * * *